(12) United States Patent
Miao et al.

(10) Patent No.: US 11,917,572 B2
(45) Date of Patent: Feb. 27, 2024

(54) TRANSMISSION DELAY INDICATION METHOD AND DEVICE

(71) Applicant: DATANG MOBILE COMMUNICATIONS EQUIPMENT CO., LTD., Beijing (CN)

(72) Inventors: Deshan Miao, Beijing (CN); Yanping Xing, Beijing (CN); Yali Zhao, Beijing (CN); Shaohui Sun, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 155 days.

(21) Appl. No.: 17/621,465

(22) PCT Filed: Mar. 30, 2020

(86) PCT No.: PCT/CN2020/082189
§ 371 (c)(1),
(2) Date: Dec. 21, 2021

(87) PCT Pub. No.: WO2020/258962
PCT Pub. Date: Dec. 30, 2020

(65) Prior Publication Data
US 2022/0386263 A1    Dec. 1, 2022

(30) Foreign Application Priority Data

Jun. 28, 2019 (CN) .......................... 201910580567.3
Nov. 15, 2019 (CN) .......................... 201911122241.2

(51) Int. Cl.
*H04W 56/00* (2009.01)
*H04B 7/185* (2006.01)
*H04L 1/1812* (2023.01)

(52) U.S. Cl.
CPC ...... *H04W 56/0065* (2013.01); *H04B 7/1851* (2013.01); *H04L 1/1812* (2013.01)

(58) Field of Classification Search
CPC ......... H04W 56/0065; H04W 74/0833; H04W 84/06; H04W 56/0045; H04W 56/0055;
(Continued)

(56) References Cited

U.S. PATENT DOCUMENTS

2018/0083694 A1    3/2018  Rajagopalan et al.
2019/0386926 A1*  12/2019  Abedini ................ H04L 47/283
(Continued)

FOREIGN PATENT DOCUMENTS

| CN | 101400081 A | 4/2009 |
| CN | 105099541 A | 11/2015 |
| CN | 109788548 A | 5/2019 |

OTHER PUBLICATIONS

Panasonic, "Issues on Timing Advance and RACH for NTN", 3GPP TSG RAN WG1 #96bis R1-190459, Apr. 12, 2019.
(Continued)

*Primary Examiner* — Afshawn M Towfighi
(74) *Attorney, Agent, or Firm* — Meunier Carlin & Curfman LLC

(57) ABSTRACT

Disclosed are a transmission delay indication method and device. In the embodiments of the present disclosure, a network device determines a common transmission delay of at least one cell, and sends the common transmission delay to a terminal in the at least one cell. The common transmission delay is used for the terminal in the at least one cell to determine a transmission timing sequence with a network side.

19 Claims, 8 Drawing Sheets

(58) Field of Classification Search
CPC ............ H04W 74/002; H04W 56/0005; H04B 7/1851; H04B 7/1853; H04B 7/18513; H04L 1/1812; H04L 5/0078; H04L 5/0091

See application file for complete search history.

(56) References Cited

U.S. PATENT DOCUMENTS

| 2020/0245278 | A1* | 7/2020 | Niu | H04W 74/0808 |
| 2020/0351957 | A1* | 11/2020 | Kim | H04W 74/0866 |
| 2021/0105761 | A1* | 4/2021 | Cheng | H04L 5/0048 |

OTHER PUBLICATIONS

Mediatek Inc., "Delay-tolerant re-transmission mechanisms in NR-NTN" 3GPP TSG RAN WG1 Meeting #97 R1-1906466, May 17, 2019.
3GPP TSG RAN WG1 Meeting #97, R1-1906325, "PRACH design and UL timing advance", Reno, USA, May 13-17, 2019.
3GPP TSG-RAN WG2 #105, R2-1900576, "Consideration on Random Access for NTN", Athens, Greece, Feb. 25-Mar. 1, 2019.
3GPP TSG-RAN WG2 Meeting #106, R2-1008246 "Random Access Procedure and RACH Capacity in NTN", Reno, USA, May 13-17, 2019.

* cited by examiner

TRANSMISSION DELAY INDICATION METHOD AND DEVICE

CROSS-REFERENCE TO RELATED APPLICATIONS

The present disclosure is a National Stage of International Application No. PCT/CN2020/082189, filed on Mar. 30, 2020, which claims the priority of the Chinese patent application No. 201910580567.3 filed to the Chinese Patent Office on Jun. 28, 2019, and entitled "Transmission Delay Indication Method and Apparatus", of which the entire contents are incorporated herein by reference; and the present disclosure claims the priority of the Chinese patent application No. 201911122241.2 filed to the Chinese Patent Office on Nov. 15, 2019, and entitled "Transmission Delay Indication Method and Apparatus", of which the entire contents are incorporated herein by reference.

FIELD

The present disclosure relates to the field of wireless communications, in particular to a transmission delay indication method and apparatus.

BACKGROUND

In a satellite communication system, a satellite moves around the earth at a high speed, so that a link distance between the satellite and a user changes constantly. For example, in a low-orbit satellite communication system, the satellite moves around the earth at a speed of about 7.9 km/s.

On the one hand, data transmission delay of a terminal changes as well due to the change of the distance, resulting in changes in uplink timing and a scheduling timing of the user, and consequently, consistency of a transmission timing between the terminal and a network device cannot be ensured.

On the other hand, due to moving of a beam, a cell coverage region of one beam on the ground changes, uplink transmission delays of terminals at different positions and locations change as well. This is a great challenge for management of uplink transmission timings of the plurality of users.

Therefore, a technical problem that needs to be solved currently is how to maintain the transmission timing between the terminal and the network device in the satellite communication system.

SUMMARY

Embodiments of the present disclosure provide a transmission delay indication method and apparatus.

In a first aspect, a transmission delay indication method is provided, and includes: determining, by a network device, a common transmission delay of at least one cell and sending the common transmission delay to a terminal in the at least one cell. The common transmission delay is configured to determine a transmission timing between the network device and the terminal in the at least one cell.

Optionally, a value of the common transmission delay is equal to an integral multiple of a data transmission time slot length.

In a possible implementation, the common transmission delay includes at least one of the following information: a reference round trip time (RTT) of data transmission between the terminal in the at least one cell and the network device; a maximum RTT of data transmission between the terminal in the at least one cell and the network device; a difference value between a maximum RTT and a reference RTT of data transmission between the terminal in the at least one cell and the network device; a transmission delay of a feeder link in a satellite communication system, wherein the feeder link is a link between a gateway station and a satellite; a reference transmission delay of a service link in a satellite communication system, wherein the service link is a link between a satellite and a terminal; a maximum transmission delay of a service link in the satellite communication system; or a difference value between a maximum transmission delay and a reference transmission delay of a service link in a satellite communication system.

Optionally, the transmission delay of the feeder link in the satellite communication system further includes: a difference value between a transmission delay of a feeder link of a current serving cell during feed link switching and a transmission delay of a feeder link of a target cell after the feed link switching.

In a possible implementation, the sending, by the network device, the common transmission delay to the terminal, includes: sending, by the network device, the common transmission delay to the terminal through broadcast information or a dedicated signaling.

In a possible implementation, the method further includes: receiving, by the network device, a timing advance (TA) of the terminal sent by the terminal; and determining, by the network device, an offset according to the TA, and updating at least one of a first time interval and a second time interval configured to perform hybrid automatic retransmission reQuest (HARQ) transmission scheduling on the terminal, wherein an updated first time interval is a sum of the first time interval configured to the terminal and the offset, an updated second time interval is a sum of the second time interval configured to the terminal and the offset; the first time interval is a transmission time interval between a physical downlink shared channel (PDSCH) and a physical uplink control channel (PUCCH), and the second time interval is a transmission time interval between a physical downlink control channel (PDCCH) and a physical uplink shared channel (PUSCH).

Optionally, a value of the offset is equal to an integral multiple of the data transmission time slot length.

In a possible implementation, the network device is a gateway station or a base station.

Optionally, in a case that the network device is the gateway station, a common transmission delay determined by the gateway station is common transmission delays of all the cells under the satellite associated with a gateway station or common transmission delays of all the terminals in one cell; and the sending, by the network device, the common transmission delay to the terminal, includes: sending, by the gateway station, the common transmission delay to at least one terminal in at least one cell in all the cells.

Optionally, in a case that the network device is the base station, a common transmission delay determined by the base station is a common transmission delay of a beam cell of the base station; and the sending, by the network device, the common transmission delay to the terminal, includes: sending, by the base station, the common transmission delay to at least one terminal in the beam cell.

Optionally, the common transmission delay includes: a transmission delay of a satellite or a gateway station and a common reference point of the at least one cell, or a difference value between transmission delays of a satellite or a gateway station and common reference points of a plurality of different cells.

Optionally, the common transmission delay includes: a TA determined based on a transmission delay of a satellite or a gateway station and a common reference point of the at least one cell, or a difference value between TAs of different cells.

In a second aspect, a transmission delay indication method is provided, and includes: receiving, by a terminal, a common transmission delay sent by a network device, and determining a transmission timing between the terminal and a network device according to the common transmission delay. The common transmission delay is configured to determine the transmission timing between the network device and the terminal in at least one cell.

A value of the common transmission delay is equal to an integral multiple of a data transmission time slot length.

In a possible implementation, the determining, by the terminal, the transmission timing between the terminal and the network device according to the common transmission delay, includes: determining, by the terminal, a starting time and a duration of a random access response (RAR) window of the terminal according to the common transmission delay, wherein the starting time of the RAR window is a moment after delaying a sending moment of a random access preamble sent by the terminal by at least a reference RTT time length, and the duration of the RAR window is equal to a sum of a difference value between a maximum RTT and a reference RTT and a base station processing delay. The common transmission delay includes at least two of the reference RTT, the maximum RTT, or the difference value between the maximum RTT and the reference RTT of data transmission, and the reference RTT, the maximum RTT, and the difference value between the maximum RTT and the reference RTT configured to determine the starting time and the duration of the RAR window by the terminal are determined by the terminal from delay information contained in the common transmission delay; or at least one of the reference RTT and the maximum RTT configured to determine the starting time and the duration of the RAR window by the terminal is determined by the terminal according to delay information contained in the common transmission delay.

Optionally, a time length by which the sending moment of the random access preamble sent by the terminal is delayed is equal to a sum of the reference RTT and a first offset. Optionally, a value of the offset is equal to the integral multiple of the data transmission time slot length.

Optionally, the first offset is equal to a difference value obtained by subtracting the reference RTT from a real RTT of the terminal.

In a possible implementation, the determining, by the terminal, the transmission timing between the terminal and the network device according to the common transmission delay, includes: determining, by the terminal, the starting time and a duration of a ra-ContentionResolutionTimer of the terminal according to the common transmission delay, wherein the starting time of the ra-ContentionResolutionTimer is a moment after delaying a sending moment of a Msg3 sent by the terminal by at least a reference RTT time length, and the duration of the ra-ContentionResolutionTimer is equal to a sum of a difference value between a maximum RTT and a reference RTT and a base station processing delay. The common transmission delay includes at least two of the reference RTT, the maximum RTT, or the difference value between the maximum RTT and the reference RTT of data transmission, and the reference RTT, the maximum RTT, and the difference value between the maximum RTT and the reference RTT configured to determine the starting time and a duration of the ra-ContentionResolutionTimer by the terminal are determined by the terminal from delay information contained in the common transmission delay; or at least one of the reference RTT and the maximum RTT configured to determine the starting time and the duration of the ra-ContentionResolutionTimer by the terminal is determined by the terminal according to delay information contained in the common transmission delay. The ra-ContentionResolutionTimer represents a timing window for the detection of a contention resolution signal in an initial access.

Optionally, a time length by which the sending moment of the Msg3 sent by the terminal is delayed is equal to a sum of the reference RTT and a second offset.

Optionally, the second offset is equal to a difference value obtained by subtracting the reference RTT from a real RTT of the terminal.

In a possible implementation, the determining, by the terminal, the transmission timing between the terminal and the network device according to the common transmission delay, includes: updating, by the terminal, at least one of a first time interval and a second time interval configured to perform HARQ transmission scheduling according to the common transmission delay, wherein an updated first time interval is a sum of the first time interval configured to the terminal and a third offset, an updated second time interval is a sum of the second time interval configured to the terminal and the third offset, the third offset is equal to a difference value obtained by subtracting a reference RTT from a maximum RTT of data transmission or equal to the maximum RTT, the first time interval is a transmission time interval between a PDSCH and a PUCCH, and the second time interval is a transmission time interval between a PDCCH and a PUSCH. The common transmission delay includes at least two of the reference RTT, the maximum RTT, or the difference value between the maximum RTT and the reference RTT of data transmission, and the reference RTT, the maximum RTT, and the difference value between the maximum RTT and the reference RTT configured to update the first time interval and the second time interval by the terminal are determined by the terminal from delay information contained in the common transmission delay; or at least one of the reference RTT and the maximum RTT configured to update the first time interval and the second time interval by the terminal are determined by the terminal according to delay information contained in the common transmission delay.

Optionally, the method further includes: determining, by the terminal, the reference RTT according to a transmission delay of a feeder link of a satellite communication system and a reference transmission delay of a service link of the satellite communication system; and determining, by the terminal, the maximum RTT according to the transmission delay of the feeder link of the satellite communication system and a maximum transmission delay of the service link of the satellite communication system, wherein the transmission delay of the feeder link, the reference transmission delay of the service link, and the maximum transmission delay of the service link are included in common transmission delay.

Optionally, the transmission delay of the feeder link of the satellite communication system includes: a difference value between a transmission delay of a feeder link of a current serving cell during feed link switching and a transmission delay of a feeder link of a target cell after the feed link switching.

Optionally, the method further includes: determining, by the terminal, the reference RTT according to a reference transmission delay of a service link of a satellite communication system; and determining, by the terminal, the maximum RTT according to a maximum transmission delay of the service link of the satellite communication system, wherein the reference transmission delay of the service link and the maximum transmission delay of the service link are included in the common transmission delay.

In a possible implementation, the common transmission delay includes at least one of the following information: a reference RTT of data transmission between the network device and the terminal in the at least one cell; a maximum RTT of data transmission between the network device and the terminal in the at least one cell; a difference value between a maximum RTT and a reference RTT of data transmission between the network device and the terminal in the at least one cell; a transmission delay of a feeder link in a satellite communication system, wherein the feeder link is a link between a gateway station and a satellite; a reference transmission delay of a service link in a satellite communication system, wherein the service link is a link between a satellite and a terminal; a maximum transmission delay of a service link in the satellite communication system; or a difference value between a maximum transmission delay and a reference transmission delay of a service link in a satellite communication system.

Optionally, the common transmission delay received by the terminal includes: a transmission delay of a satellite or a gateway station and a common reference point of the at least one cell, or a difference value between transmission delays of different cells.

Optionally, the common transmission delay received by the terminal includes: a timing advance (TA) determined based on a transmission delay of a satellite or a gateway station and a common reference point of the at least one cell, or a difference value between TAs of different cells.

Optionally, the method further includes: obtaining, by the terminal, a transmission delay difference value, obtaining a new time point by increasing the transmission delay difference value by taking a time of a current serving cell as a datum, measuring a synchronization signal and PBCH block (SSB) of a neighbor cell or a target cell at the new time point, and establishing downlink synchronization with a network or obtaining broadcast information at the neighbor cell or the target cell. The transmission delay difference value is a transmission delay difference value between the current serving cell and the neighbor cell received by the terminal, or a transmission delay difference value between the current serving cell and the target cell after cell switching, or a transmission delay difference value obtained by deducing after performing subtraction operation when the terminal obtains TAs or transmission delays of a plurality of cells.

In a third aspect, a network device is provided, and includes: a processing module, configured to determine a common transmission delay of at least one cell, wherein the common transmission delay is configured to determine a transmission timing between the network device and a terminal in the at least one cell; and a sending module, configured to send the common transmission delay to the terminal in the at least one cell.

In a fourth aspect, a terminal is provided, and includes: a receiving module, configured to receive a common transmission delay sent by a network device, wherein the common transmission delay is configured to determine a transmission timing between the network device and a terminal in at least one cell; and a processing module, configured to determine the transmission timing between the terminal and the network device according to the common transmission delay.

In a fifth aspect, a network device is provided, and includes: a processor, a memory and a transceiver, wherein the processor is configured to read a computer instruction in the memory to execute any method in the above first aspect.

In a sixth aspect, a terminal is provided, and includes: a processor, a memory and a transceiver, wherein the processor is configured to read a computer instruction in the memory to execute any method in the above second aspect.

In a seventh aspect, a computer readable storage medium is provided, and stores a computer executable instruction, wherein the computer executable instruction is configured to enable a computer to execute any method in the above first aspect.

In an eighth aspect, a computer readable storage medium is provided, and stores a computer executable instruction, wherein the computer executable instruction is configured to enable a computer to execute any method in the above second aspect.

In the above embodiments of the present disclosure, the network device determines the common transmission delay, and sends the common transmission delay to the terminal in the at least one cell, where the common transmission delay is configured to determine the transmission timing between the network device and the terminal in the at least one cell, so that the consistency of the transmission timing between the terminal and the network device is maintained.

DETAILED DESCRIPTION OF THE EMBODIMENTS

Figure 1:
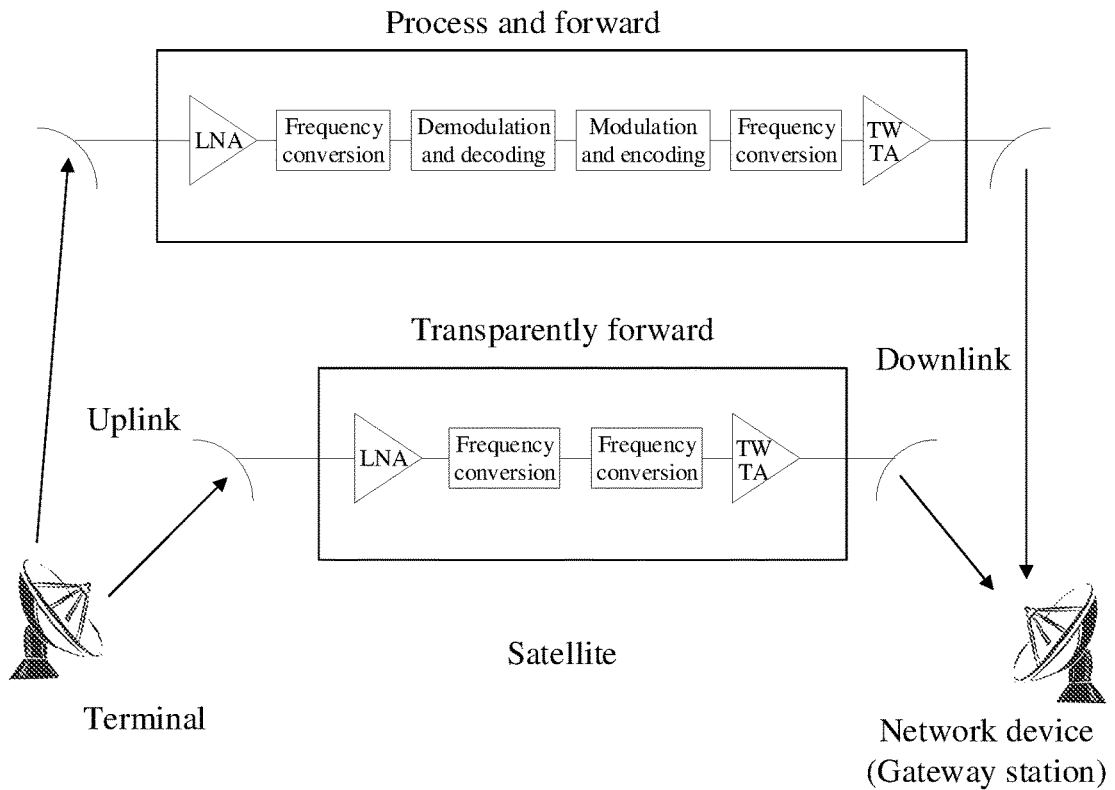
FIG. 1 exemplarily shows a schematic diagram of two communication modes in a satellite communication system in an embodiment of the present disclosure.

FIG. 1 exemplarily shows two communication modes in a satellite communication system.

There are two working modes in satellite communications. One is a bent pipe communication mode. Under this mode, a satellite only transparently forwards a signal, and does not make other processing, and a terminal is communicated with a gateway station. Another one is a regeneration communication mode. Under this mode, the satellite detects information for receiving a signal, and processes and forwards, so as to realize a function of a base station, to connect a terminal with a gateway station. In a satellite communication system, a link between a terminal and a satellite is called a service link, and a link between a satellite and a gateway station is called a feeder link.

As for the bent pipe communication mode, the terminal and the gateway station will undergo a transmission delay T1 of the feeder link and a transmission delay T2 of the service link during data communication, and a round trip time (RTT) transmitted by it is equal to 2×(T1+T2). As for the regeneration communication mode, a transmission delay of the terminal and the satellite includes the transmission delay T2 of the service link, and the RTT is equal to 2×T2. In one beam cell, a maximum RTT corresponds to a transmission delay of a terminal and a network device (the gateway station or the satellite) with a furthest distance, and a minimum RTT corresponds to a transmission delay of a terminal and a network device (the gateway station or the satellite) with a closest distance. Because the satellite moves, a radius and a coverage region of a cell also changes with the satellite, and a numerical value of the RTT is variable. Meanwhile, different users are located in different geographic positions, and distances between the users and the network device are also different.

Figure 2:
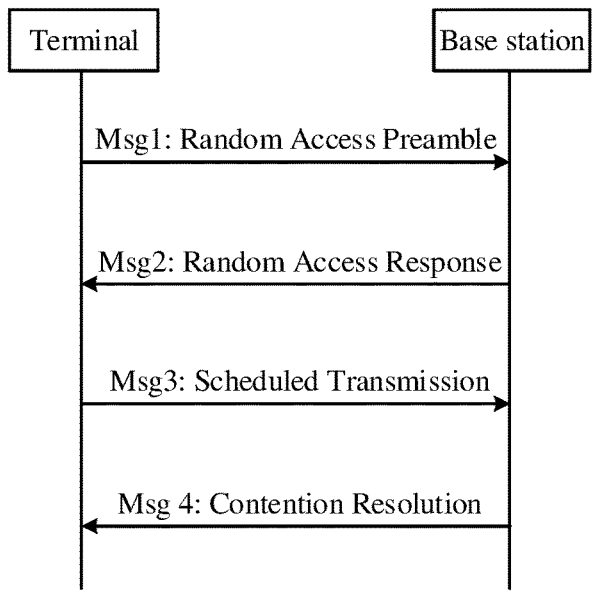
FIG. 2 exemplarily shows a signaling interaction diagram in a contention-based random access process in an embodiment of the present disclosure.

FIG. 2 exemplarily shows a contention-based random access process.

When an initial cell is accessed, the terminal (UE) accesses a network through the contention-based random access process, and the process includes the following four steps.

Msg1: the terminal selects a random access preamble and a physical random access channel (PRACH) resource, and sends the selected random access preamble to the base station by using the PRACH resource.

Msg2: the terminal starts a random access response (RAR) window (RAR window) at a first physical downlink control channel (PDCCH) occasion after sending the random access preamble, and monitors an RAR message in the RAR window. The RAR message includes a random access preamble identity, timing advance (TA) information, an uplink grant (UL grant) resource, and a temporary cell-radio network temporary identity (C-RNTI) allocated to the terminal by the network device.

Msg3: the terminal sends uplink transmission on the uplink grant (UL grant) resource designated by Msg2. Uplink transmission contents of Msg3 corresponding to random access triggered by different random access reasons are different. For example, as for an initial access, a message transmitted by Msg3 is a radio resource control (RRC) connection establish request message.

Msg4: after sending Msg3, the terminal starts a ra-ContentionResolutionTimer at a first symbol after sending Msg3, monitors the PDCCH during running of the ra-ContentionResolutionTimer, receives a contention resolution message, and judges whether the random access is successful or not according to whether contention is resolved or not. As for the initial access terminal, after contention resolution is successful, the temporary C-RNTI is automatically converted into a unique terminal identity C-RNTI of the terminal in the cell.

Figure 3:
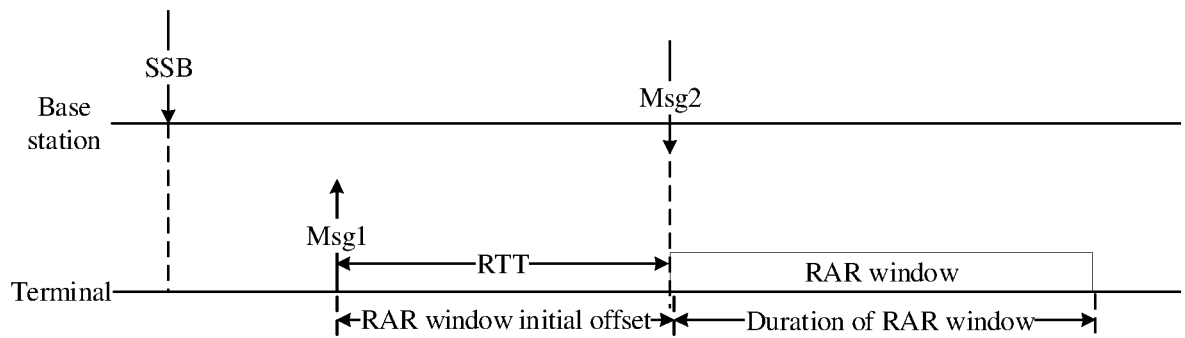
FIG. 3 exemplarily shows a schematic diagram of RAR reception in an embodiment of the present disclosure.

FIG. 3 exemplarily shows a schematic diagram of RAR reception.

As shown in FIG. 3, after sending the random access preamble, the terminal receives the RAR message sent by the network device at a designated position. At the moment, the terminal needs to know a starting time and a duration of the RAR window.

The terminal needs to start RAR detection according to an RTT interval after sending the random access preamble, that is, a starting offset of the RAR window is equal to one RTT, and the duration of the RAR window is configured based on a processing delay of the base station, that is, the duration of the RAR window is equal to the processing delay of the base station. Because at the time of an initial access, the network device does not know a real position of the terminal, the duration of the RAR window needs to consider RTT difference of different terminals.

Figure 4:
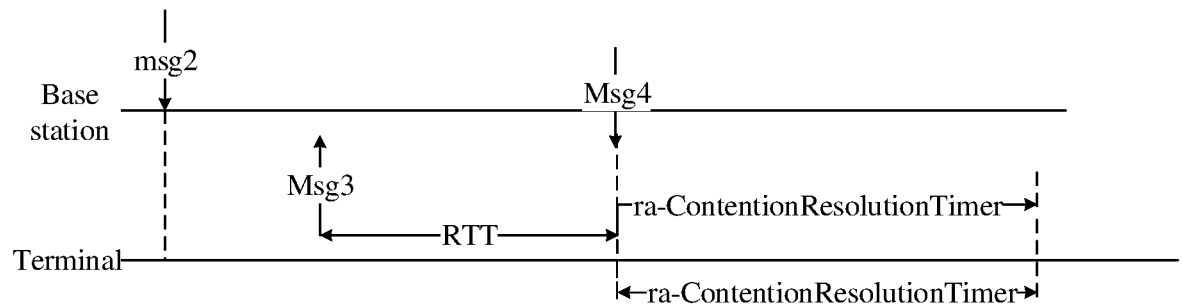
FIG. 4 exemplarily shows a schematic reception diagram of a contention resolution message in an embodiment of the present disclosure.

FIG. 4 exemplarily shows a schematic reception diagram of a contention resolution message.

As for contention resolution of the random access, after sending the Msg3, the terminal needs to wait arrival of a convention resolution message (Msg4), and at the moment, a starting point for receiving the convention resolution message (Msg4) and a duration of the ra-ContentionResolutionTimer need to be considered.

The terminal starts a detection starting point of the convention resolution message (Msg4) according to the RTT, that is, the terminal determines a starting time of the timer, and configures the duration of the timer according to the processing delay of the base station, wherein the duration of the timer is equal to the processing delay of the base station. Because at the time of initial access, the network does not know the real position of the terminal, the duration of the timer needs to consider a RTT difference of different terminals.

In hybrid automatic retransmission reQuest transmission, in order to guarantee stable running of the timing, the base station needs to consider an uplink timing advance (TA) of the terminal and a processing time of the terminal when scheduling a physical downlink shared channel (PDSCH) and a physical uplink shared channel (PUSCH). The base station configures K0, K1 and K2 for the terminal, wherein K0 is a time interval of the PDCCH and the PDSCH, K1 is a time interval of the PDSCH and a physical uplink control channel (PUCCH), K2 is a time interval of the PDCCH and the PUSCH, and these intervals are generally related to a processing ability of the terminal and the timing advance (TA). Furthermore, as for K1 and K2, because the timing of the PUSCH/PUCCH and the timing of the PDSCH have a TA interval, a difference on a sub-frame index of the PDSCH/PUCCH and the PDCCH/PUSCH reflected by K1 and K2 is not an absolute time difference.

Figure 5:
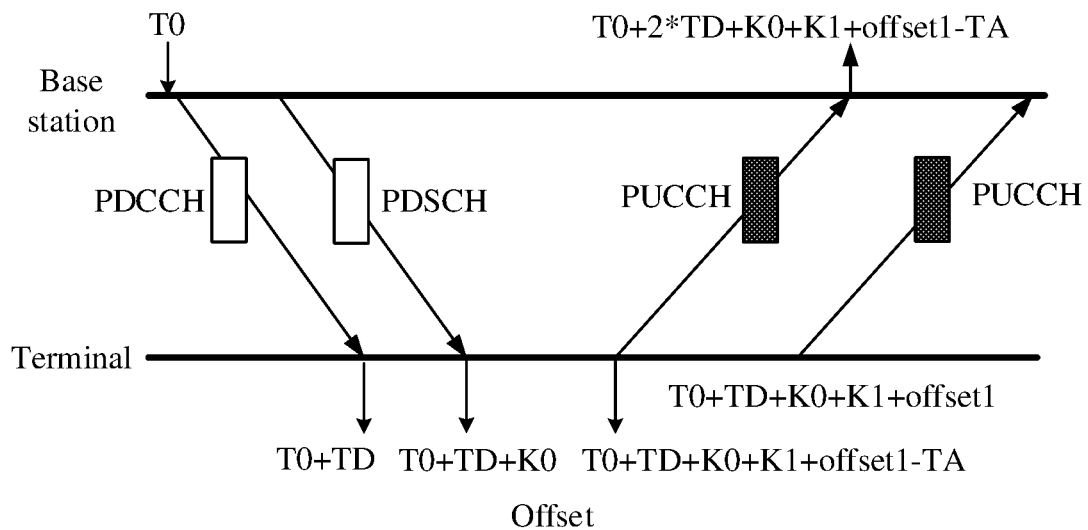
FIG. 5 exemplarily shows a schematic diagram of a downlink scheduling timing in an embodiment of the present disclosure.

FIG. 5 exemplarily shows a schematic diagram of a downlink scheduling timing.

As shown in FIG. 5, the base station sends the PDCCH at a T0 moment, the terminal receives the PDSCH at a T0+TD+K0 moment, wherein K0 is the time interval between the PDCCH and the PDSCH configured by the base station, TD is a transmission delay from the base station to the terminal, and meanwhile, a moment when the base station designates the PUCCH to feed back HARQ-ACK is a K1 moment after receiving the PDSCH. In consideration of the uplink TA of the terminal, a scheduled transmission moment of the PUCCH is T0+TD+K0+K1+offset1, and a transmission moment after really proceeding the TA timing advance is T0+TD+K0+K1+offset1-TA. A value of the TA is based on a compensation algorithm of a real TA, and if absolute TA compensation is adopted, the TA is equal to 2×TD.

At the time of the initial access, the network device does not know a numerical value of the TA, and therefore, the terminal and the network have inconsistency in timing. After the terminal is subjected to TA compensation, the network does not know the value of the TA compensated by the terminal, and therefore, the network device will have a problem when receiving an uplink signal.

Figure 6:
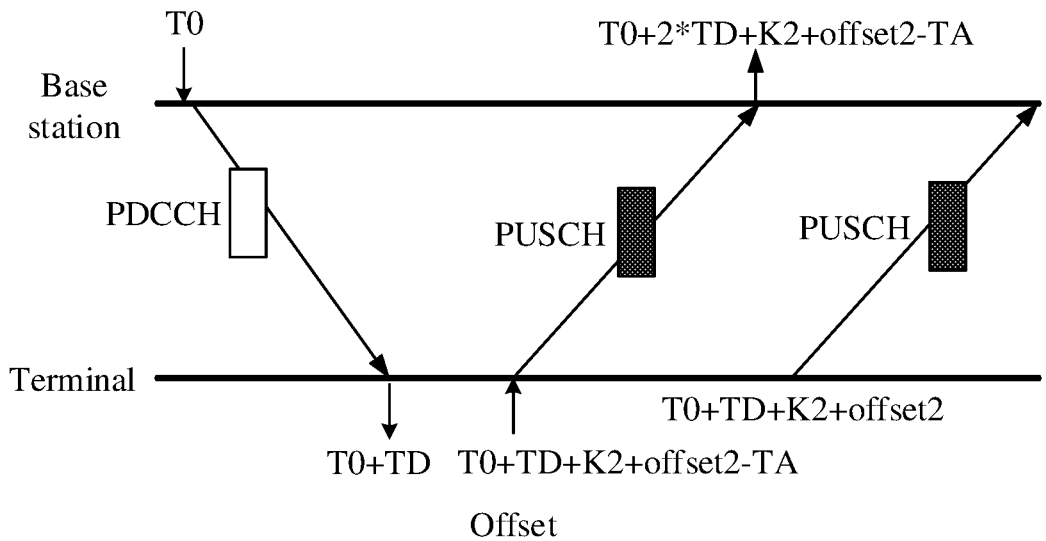
FIG. 6 exemplarily shows a schematic diagram of a scheduling timing of an uplink PUSCH in an embodiment of the present disclosure.

FIG. 6 exemplarily shows a scheduling timing of an uplink PUSCH. A scheduled transmission moment of the PUSCH is T0+TD+K2+offset2, but a transmission moment after really proceeding the TA timing advance is T0+TD+K2+offset2-TA.

In conclusion, in the satellite communication system, the change of the transmission delay will lead to inconsistency of the transmission timing between the terminal and the network device, which can be specifically embodied in the following several aspects.

A first aspect, the terminal does not know an RTT range of a cell so that a proper random access detection window (for example, the RAR window, the ra-ContentionResolutionTimer) cannot be set.

A second aspect, the terminal does not know a datum RTT so that TA compensation cannot be performed.

A third aspect, the network device does not know a compensation value of the TA of the terminal, so that an uplink data signal cannot be received in a correct time window.

At present, a transmission delay of a ground 5G system is short, and therefore, a configuration of a RAR window or a configuration of a ra-ContentionResolutionTimer in the 5G system cannot be directly applied to a satellite communication system. In addition, during HARQ control, different terminals have different TA compensation numerical values, a network device is hard to track timings of the different terminals, or the terminal cannot maintain synchronization with the network device based on a specific timing, and therefore, a new technical solution is needed to solve the above problems.

Meanwhile, timing relationships of different cells are different due to cell switching brought by beam movements, and how to maintain quick synchronization with a target cell by the terminal after switching is also an important problem.

For this purpose, embodiments of the present disclosure provide a transmission delay indication method. By adopting the embodiments of the present disclosure, a network device sends a common transmission delay to a terminal, so that the network device and the terminal determine a scheduling timing relationship of a random access detection window and an HARQ based on the common transmission delay. Therefore, consistency of a transmission timing between the terminal and the network device is maintained.

The embodiments of the present disclosure are described below in detail with reference to the drawings.

Figure 7:
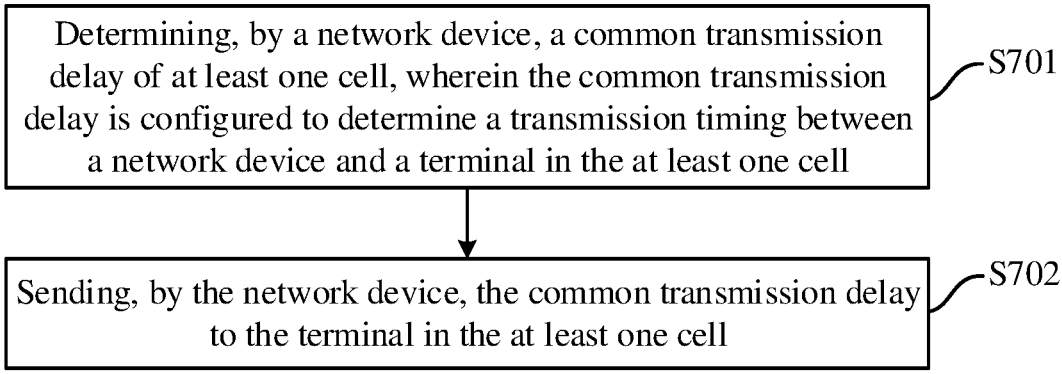
FIG. 7 exemplarily shows a schematic flow diagram of a network device side in an embodiment of the present disclosure.

FIG. 7 exemplarily shows a flow executed by the network device in the embodiments of the present disclosure.

As show in the figure, the flow includes S701 and S702.

S701, the network device determines the common transmission delay.

The common transmission delay is a common transmission delay of at least one cell, is shared by terminals in the at least one cell, and is configured to determine the transmission timing between the terminal and the network device by the terminal in the at least one cell.

S702, the network device sends the common transmission delay to the terminal in the at least one cell.

Optionally, the common transmission delay includes at least one of the following information (1) to (7).

(1) A reference RTT of data transmission, wherein the data transmission refers to the data transmission between the terminal and the network device.

The reference RTT is used as a datum RTT. The reference RTT is a timing datum RTT of the terminals in the cell, is determined according to a minimum RTT in the cell, but is not always the same as the minimum RTT in one cell, which depends on network configuration due to the fact that the minimum RTT directly corresponds to a cell coverage. The reference RTT is timing datums of all the terminals in the cell, and is relatively and slowly varied.

(2) A maximum RTT of the data transmission.

(3) A difference value between the maximum RTT and the reference RTT of the data transmission.

(4) A transmission delay of a feeder link (a link between a gateway station and a satellite) in a satellite communication system.

(5) A reference transmission delay of a service link (a link between the satellite and the terminal) in the satellite communication system.

(6) A maximum transmission delay of the service link in the satellite communication system.

(7) A difference value between the maximum transmission delay and the reference transmission delay of the service link in the satellite communication system.

According to parameter categories of the above common transmission delay, in some embodiments, the network device sends at least two parameters of the reference RTT, the maximum RTT and the difference value between the reference RTT and the maximum RTT to the terminal, so that the terminal directly obtains the reference RTT and the maximum RTT of the data transmission, and further determines the scheduling timing relationship of the random access detection window and the HARQ according to the reference RTT and the maximum RTT. If a bent pipe communication mode is adopted between the terminal and the network device, the network device sends the reference RTT, the maximum RTT and the difference value between the reference RTT and the maximum RTT of the data transmission under the bent pipe communication mode; and if a regeneration communication mode is adopted between the terminal and the network device, the network device sends the reference RTT, the maximum RTT and the difference value between the reference RTT and the maximum RTT of the data transmission under the regeneration communication mode.

According to the parameter categories of the above common transmission delay, in some other embodiments, in the case that the bent pipe communication mode is adopted between the network device and the terminal for communication, the network device sends the transmission delay related to the feeder link and the transmission delay related to the service link to the terminal. Specifically, the network device sends the transmission delay of the feeder link, the reference transmission delay of the service link, and the maximum transmission delay of the service link to the terminal, so that the terminal determines at least two of the reference RTT, the maximum RTT and the difference value between the reference RTT and the maximum RTT of the data transmission under the bent pipe communication mode according to the parameters, so as to further determine the scheduling timing relationship of the random access detection window and the HARQ according to the at least two of the determined reference RTT, maximum RTT and difference value between the reference RTT and the maximum RTT.

According to the parameter categories of the above common transmission delay, in some other embodiments, in the case that the regeneration communication mode is adopted between the network device and the terminal for communication, the network device sends the transmission delay related to the service link to the terminal. Specifically, the network device sends the reference transmission delay of the service link and the maximum transmission delay of the service link to the terminal, so that the terminal determines at least two of the reference RTT, the maximum RTT and the difference value between the reference RTT and the maximum RTT of the data transmission under the regeneration communication mode, so as to further determine the scheduling timing relationship of the random access detection window and the HARQ according to at least two of the determined reference RTT, maximum RTT and difference value between the reference RTT and the maximum RTT.

In consideration that the terminal needs the reference RTT and the maximum RTT of the data transmission when determining the scheduling timing relationship of the random access detection window and the HARQ, in another embodiment of the present disclosure, in the case that the bent pipe communication mode is adopted between the network device and the terminal, the network device further sends the reference RTT as well as the transmission delay of the feeder link and the maximum transmission delay of the feeder link for deducing the maximum RTT to the terminal; and in the case that the regeneration communication mode is adopted between the network device and the terminal, the network device further sends the reference RTT and the maximum transmission delay of the service link for deducing the maximum RTT to the terminal. In this way, as for the parameters needed by the scheduling timing relationship of the random access detection window and the HARQ, one part is directly obtained by the terminal from the received common transmission delay, and the other part is obtained by the terminal by deducing from the parameters in the received common transmission delay.

It should be noted that combination modes of the parameters contained in the above various common transmission delays are only examples, and specific implementation of the embodiment of the present disclosure may not be limited by the above combination modes.

The above flow may be applied to the satellite communication system. In the satellite communication system, the network device in FIG. 7 is the gateway station or a base station.

Optionally, if the network device in FIG. 7 is the gateway station, in S701, a common transmission delay determined by the gateway station is common transmission delays of all the cells under the satellite associated with the gateway station or common transmission delays of all the terminals in one cell; and in S702, the gateway station sends the common transmission delay to at least one terminal in the at least one cell in all the cells. Specifically, the gateway station sends the common transmission delay to at least one base station in all the base stations connected with the gateway station, and then the base station sends the common transmission delay to the terminal.

Optionally, if the network device in FIG. 7 is the base station, in S701, a common transmission delay determined by the base station is a common transmission delay of a beam cell of the base station; and in S702, the base station sends the common transmission delay to at least one terminal in the beam cell.

Optionally, in S702 in FIG. 7, the network device sends the common transmission delay to the terminal through broadcast information or a dedicated signaling. The broadcast information may specifically be a system information block (SIB), and the dedicated signaling may be an RRC signaling. The terminal monitors a broadcast channel, therefore, when the common transmission delay is sent through the broadcast information, all terminals in one cell may receive the common transmission delay. When the common transmission delay is sent through the dedicated signaling, the common transmission delay may be sent to a specific target terminal. During specific implementation, different sending modes may be adopted according to requirements.

Optionally, in some embodiments, the transmission delay of the feeder link in the satellite communication system further includes: a difference value between a transmission delay of a feeder link of a current serving cell during feed link switching and a transmission delay of a feeder link of a target cell after the feed link switching.

Optionally, in some embodiments, the common transmission delay includes: a transmission delay of the satellite or the gateway station and a common reference point of the at least one cell, or a difference value between transmission delays of the satellite or the gateway station and the common reference points of a plurality of different cells.

Optionally, in some embodiments, the common transmission delay includes: a TA determined based on the transmission delay of the satellite or the gateway station and the common reference point of the at least one cell, or a difference value between TAs of different cells.

Figure 8:
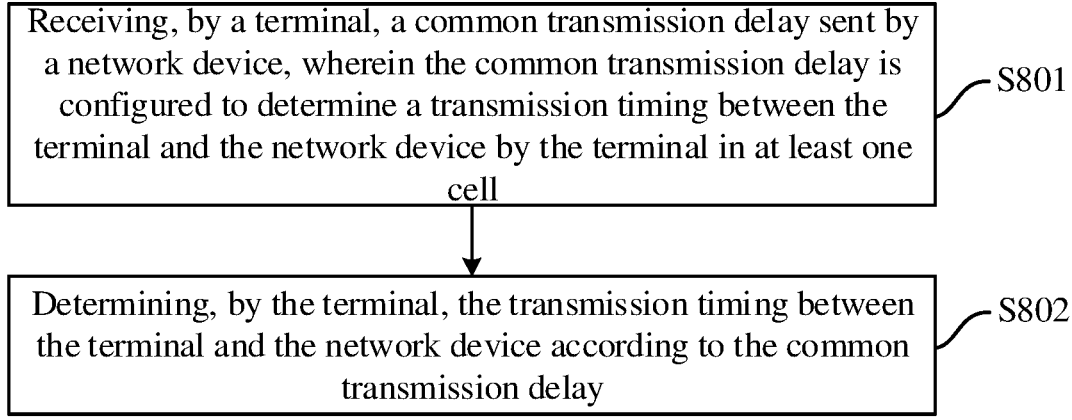
FIG. 8 exemplarily shows a schematic flow diagram of a terminal in an embodiment of the present disclosure.

FIG. 8 exemplarily shows a flow at a terminal in the embodiment of the present disclosure.

As shown in FIG. 8, the flow includes: S801 and S802.

S801, a terminal receives a common transmission delay sent by a network device.

Related description and sending methods of the common transmission delay refer to that of the aforementioned embodiments, which is not repeated here.

S802, the terminal determines a transmission timing between the terminal and a network device according to the common transmission delay.

Optionally, in some embodiments of the present disclosure, the determining the transmission timing between the terminal and the network device includes: configuring a detection window in a random access process. More specifically, the configuring the detection window in the random access process includes at least one of the following configuring operations: configuring an RAR window, and configuring a ra-ContentionResolutionTimer.

Optionally, the configuring the RAR window in the random access process by the terminal includes: configuring a starting time and a duration of the RAR window. The starting time of the RAR window is a moment after delaying a sending moment of a random access preamble (Msg1 message) sent by the terminal by at least a reference RTT time length, and the duration of the RAR window is equal to a sum of a difference value between a maximum RTT and a reference RTT and a processing delay of a base station.

Optionally, the terminal further configures a first offset, configured to perform offset on the basis of the above determined starting time of the RAR window. Specifically, the starting time of the RAR window is: a time length after delaying the sending moment of the random access preamble (Msg1 message) sent by the terminal by a sum of the reference RTT and the first offset.

Different terminals configure magnitudes of first offsets according to their requirements, and the magnitudes of the first offsets configured by the different terminals may be different. Optionally, the first offset configured by a terminal is equal to a different value obtained by subtracting the reference RTT from a real RTT of the terminal. In this way, the starting time of the RAR window is: a time length after delaying the sending moment of the random access preamble (Msg1 message) sent by the terminal by the real RTT of the terminal.

Figure 9:
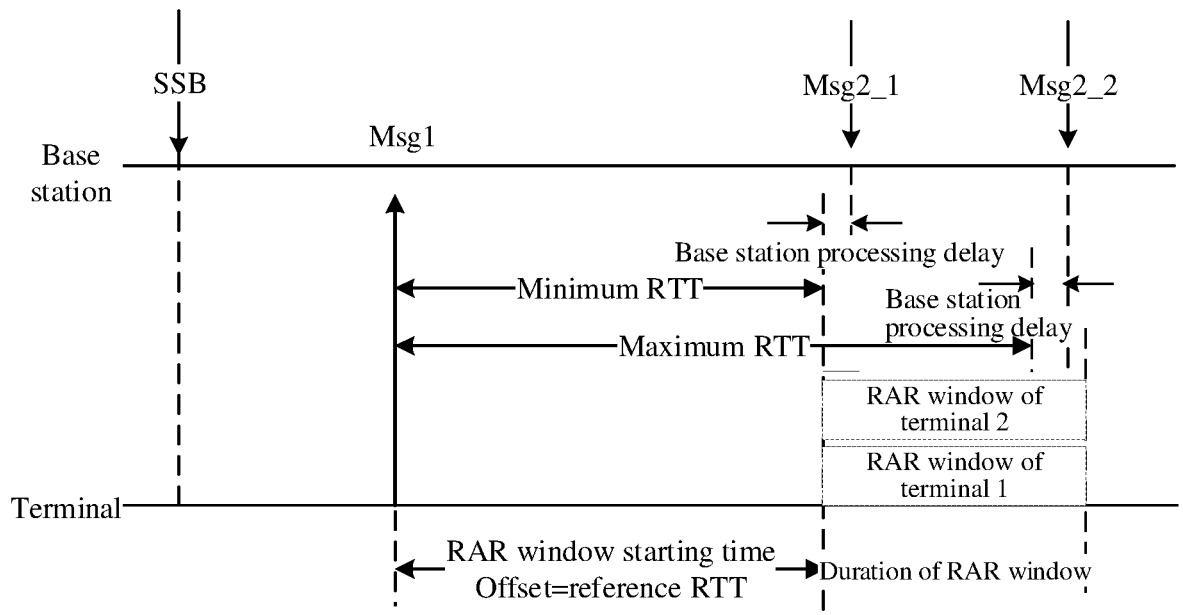
FIG. 9 exemplarily shows a schematic configuration diagram of an RAR window in an embodiment of the present disclosure.

FIG. 9 exemplarily shows a schematic configuration diagram of the RAR window in the embodiment of the present disclosure.

As shown in the figure, when an initial cell is accessed, after sending the random access preamble (Msg1 message), the terminal needs to receive an RAR message (Msg2 message) sent by the network device at a designated position, and at the moment, the terminal needs to determine a starting time and a duration of the RAR window.

In order to facilitate comparison, in an example, a terminal (terminal 1) closest to the base station and a terminal (terminal 2) furthest from the base station send the Msg1 message at the same moment. An RAR message (shown as Msg2_1 in the figure) sent to the terminal 1 by the base station and an RAR message (shown as Msg2_2 in the figure) sent to the terminal 2 by the base station are inconsistent in arrival time. A time length between a moment of sending the Msg2_1 message to the terminal 1 by the base station and a moment of sending the Msg1 message by the terminal 1 is roughly a sum of a time length of a minimum RTT and a processing delay of a base station, and a time length between a moment of sending the Msg2_2 message to the terminal 2 by the base station and a moment of sending the Msg1 message by the terminal 2 is roughly a sum of a time length of a maximum RTT and a processing delay of a base station.

If the reference RTT is basically equal to the minimum RTT, as shown in the figure, the RAR windows of the terminal 1 and the terminal 2 are backwardly offset by the time length of one reference RTT from the sending moment of the Msg1 message, and the window lengths are equal to the processing delay of the base station+(the maximum RTT−the reference RTT). It may be seen that an arrival moment of the Msg2_1 message is in the RAR window of the terminal 1, an arrival moment of the Msg2_2 message is in the RAR window of the terminal 2, and therefore, by adopting the method provided by the embodiment of the present disclosure to configure the RAR window, it may be ensured that the terminal can receive the RAR message sent by the base station.

Optionally, configuring the ra-ContentionResolutionTimer in the random access process by the terminal includes: configuring a starting time and a duration of the timer. The starting time of the ra-ContentionResolutionTimer is a moment after delaying a sending moment of an Msg3 message sent by the terminal by at least a reference RTT time length, and the duration of the ra-ContentionResolutionTimer is equal to a sum of a difference value between the maximum RTT and the reference RTT and the processing delay of the base station.

Optionally, the terminal further configures a second offset, configured to perform offset on the basis of the above determined starting time of the ra-ContentionResolutionTimer. Specifically, the starting time of the ra-ContentionResolutionTimer is: a time length after delaying the sending moment of the Msg3 message sent by the terminal by a sum of the reference RTT and the second offset.

The different terminals configure magnitudes of the second offsets according to their requirements, and the magnitudes of the second offsets configured by the different terminals may be different. Optionally, the second offset configured by one terminal is equal to a different value obtained by subtracting the reference RTT from a real RTT of the terminal.

Figure 10:
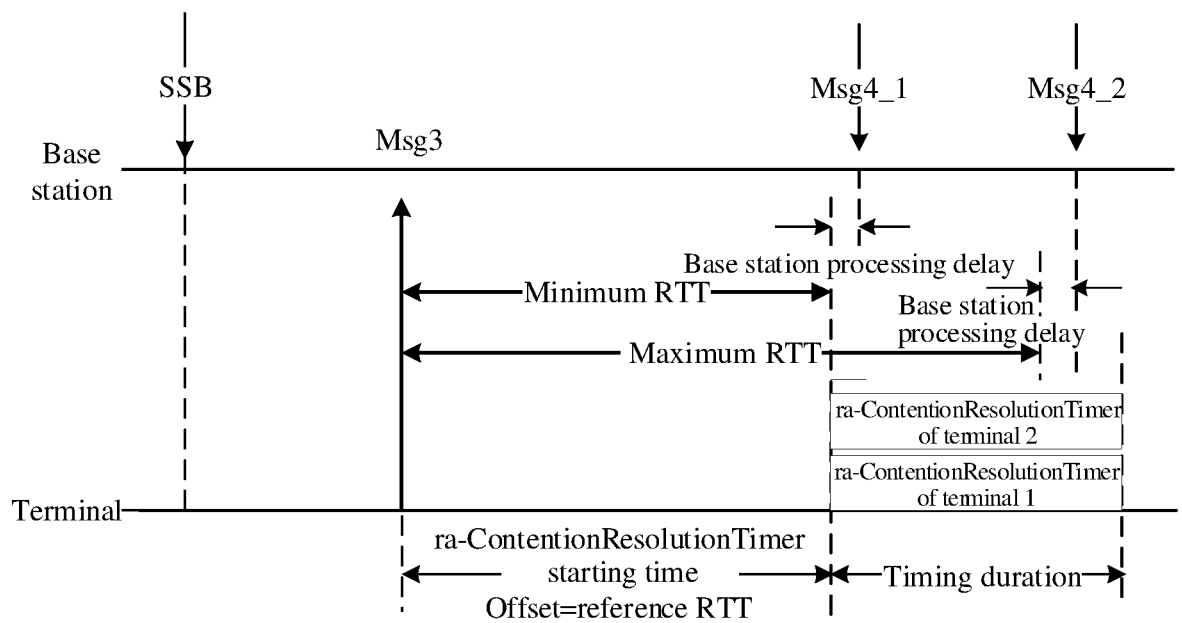
FIG. 10 exemplarily shows a schematic configuration diagram of a ra-ContentionResolutionTimer in an embodiment of the present disclosure.

FIG. 10 exemplarily shows a schematic configuration diagram of the ra-ContentionResolutionTimer in the embodiment of the present disclosure.

As shown in the figure, when the initial cell is accessed, after sending the Msg3 message, the terminal needs to receive a contention resolution message (Msg4 message) sent by the network device at a designated position, and at the moment, the terminal needs to determine the starting time and the duration of the ra-ContentionResolutionTimer.

In order to facilitate comparison, in an example, the terminal (terminal 1) closest to the base station and the terminal (terminal 2) furthest from the base station send the Msg3 message at the same moment. An Msg4 message (shown as Msg4_1 in the figure) sent to the terminal 1 by the base station and an Msg4 message (shown as Msg4_2 in the figure) sent to the terminal 2 by the base station are inconsistent in arrival time. A time length between a moment of sending the Msg4_1 message to the terminal 1 by the base station and a moment of sending the Msg3 message by the terminal 1 is roughly the sum of a time length of a minimum RTT and a processing delay of a base station, and a time length between a moment of sending the Msg4_2 message to the terminal 2 by the base station and a moment of sending the Msg3 message by the terminal 2 is roughly a sum of a time length of a maximum RTT and a processing delay of a base station.

If the reference RTT is basically equal to the minimum RTT, as shown in the figure, the ra-ContentionResolutionTimers of the terminal 1 and the terminal 2 start from a moment backwardly offsetting by the time length of one reference RTT from the sending moment of the Msg3 message, and the timing lengths are equal to the processing delay of the base station+(the maximum RTT−the reference RTT). It may be seen that an arrival moment of the Msg4_1 message is in the timing time of the ra-ContentionResolutionTimer of the terminal 1, an arrival moment of the Msg4_2 message is in the timing time of the ra-ContentionResolutionTimer of the terminal 2, and therefore, by adopting the method provided by the embodiment of the present disclosure to configure the ra-ContentionResolutionTimer, it may be ensured that the terminal can receive the Msg4 message sent by the base station.

In the above embodiments, the detection window (the RAR window or the ra-ContentionResolutionTimer) is configured in the random access process based on at least one of the reference RTT, the maximum RTT and the difference value between the maximum RTT and the reference RTT, and at least two of the reference RTT, the maximum RTT and the difference value between the maximum RTT and the reference RTT are contained in the common transmission delay sent by the network device, that is, the at least two are served as common transmission delay parameters to be contained in a set of common transmission delay parameters. Alternatively, the detection window (the RAR window or the ra-ContentionResolutionTimer) is configured in the random access process based on at least one of the reference RTT and the maximum RTT, the at least one of the reference RTT and the maximum RTT is determined by the terminal according to the common transmission delay, that is, the at least one of the reference RTT and the maximum RTT is deduced by the terminal according to parameters in a set of common transmission delay parameters.

For example, the following cases may be included.

Case 1: the common transmission delay sent by the network device includes the reference RTT and the maximum RTT of the data transmission, and then the terminal directly obtains the reference RTT, the maximum RTT and the difference value between the maximum RTT and the reference RTT according to the common transmission delay sent by the network device, so as to configure the detection window (the RAR window or the ra-ContentionResolutionTimer) in the random access process.

In the case that the terminal and the network device are in communication by adopting the bent pipe communication mode, the reference RTT and the maximum RTT sent by the network device are the reference RTT and the maximum RTT under the bent pipe communication mode. In the case that the terminal and the network device are in communication by adopting the regeneration communication mode, the reference RTT and the maximum RTT sent by the network device are the reference RTT and the maximum RTT under the regeneration communication mode.

Case 2: the common transmission delay sent by the network device includes the reference RTT of the data transmission and the difference value between the maximum RTT and the reference RTT, and then the terminal directly obtains the reference RTT, the maximum RTT, and the difference value between the maximum RTT and the reference RTT according to the common transmission delay sent by the network device, so as to configure the detection window (the RAR window or the ra-ContentionResolutionTimer) in the random access process.

In the case that the terminal and the network device are in communication by adopting the bent pipe communication mode, a difference value between the reference RTT and an RTT sent by the network device is a difference value between the reference RTT and the RTT under the bent pipe communication mode. In the case that the terminal and the network device are in communication by adopting the regeneration communication mode, a difference value between the reference RTT and the RTT sent by the network device is a difference value between the reference RTT and the RTT under the regeneration communication mode.

Case 3: the common transmission delay sent by the network device includes the maximum RTT of the data transmission and the difference value between the maximum RTT and the reference RTT, and then the terminal directly obtains the reference RTT, the maximum RTT, and the difference value between the maximum RTT and the reference RTT according to the common transmission delay sent by the network device, so as to configure the detection window (the RAR window or the ra-ContentionResolutionTimer) in the random access process.

In the case that the terminal and the network device are in communication by adopting the bent pipe communication mode, a difference value between the maximum RTT and the RTT sent by the network device is the difference value of the maximum RTT and the RTT under the bent pipe communication mode. In the case that the terminal and the network device are in communication by adopting the regeneration communication mode, the difference value between the maximum RTT and the RTT sent by the network device is the difference value of the maximum RTT and the RTT under the regeneration communication mode.

Case 4: in the case of adopting the bent pipe communication mode, the common transmission delay sent by the network device includes a transmission delay of a feeder link, a reference transmission delay of a service link, and a maximum transmission delay of the service link, and then the terminal calculates the reference RTT, the maximum RTT, and the difference value of the maximum RTT and the reference RTT according to the above parameters as following.

$$\text{Reference RTT} = 2 \times (\text{transmission delay of feeder link} + \text{reference transmission delay of service link}).$$

$$\text{Maximum RTT} = 2 \times (\text{transmission delay of feeder link} + \text{maximum transmission delay of service link}).$$

$$\text{RTT difference value} = \text{maximum RTT} - \text{reference RTT}.$$

Case 5: in the case of adopting the regeneration communication mode, the common transmission delay sent by the network device includes the reference transmission delay of the service link, and the maximum transmission delay of the service link, and then the terminal calculates the reference RTT, the maximum RTT, and the difference value of the maximum RTT and the reference RTT according to the above parameters as following.

$$\text{Reference RTT} = 2 \times \text{reference transmission delay of service link}.$$

$$\text{Maximum RTT} = 2 \times \text{maximum transmission delay of service link}.$$

$$\text{RTT difference value} = \text{maximum RTT} - \text{reference RTT}.$$

It should be noted that only several possible cases are listed above, and specific implementation is not limited by the above several cases.

Optionally, in some embodiments of the present disclosure, the network device and the terminal configure a timing of an HARQ.

Different from ground mobile communication, a numerical value of the TA of satellite communication is large, and in HARQ transmission, in order to ensure reliability of the timing, the base station needs to consider an uplink timing advance (TA) of a user and a processing time of the terminal when scheduling a PDSCH and a PUSCH.

Optionally, in some embodiments of the present disclosure, in the case that the terminal adopts a relative TA for compensation, an uplink timing of the terminal and the reference RTT are uplink aligned, that is, wherever the terminal is geographically, the terminal is aligned with a time point of the reference RTT after proceeding the sent timing advance. The different terminals are different in transmission delays, thus numerical values of the TA are also different, and during initial access, the network device configures a scheduling time interval by using the difference value of the maximum RTT and the reference RTT as the greatest possible TA.

Therefore, in the embodiment of the present disclosure, in the case that the terminal performs relative TA compensation, at the terminal, the terminal updates at least one of K1 (a transmission time interval between the PDSCH and a PUCCH) and K2 (a transmission time interval between a PDCCH and the PUSCH) configured to perform HARQ transmission scheduling. The updated K1 is equal to a sum of K1 configured to the terminal and one offset, and the updated K2 is equal to a sum of K2 configured to the terminal and one offset. Optionally, the offset is equal to a difference value obtained by subtracting the reference RTT from the maximum RTT of data transmission, that is, the offset needs to be equal to a maximum relative TA value.

Optionally, under the above case, at the network device, when the base station performs HARQ transmission scheduling, the same method may also be adopted to increase the above offset (the difference value obtained by subtracting the reference RTT from the maximum RTT) on the basis of K1 and K2 configured to the terminal, and perform the HARQ transmission scheduling on the terminal based on adjusted K1 and K2.

In the case that the terminal performs absolute TA compensation, uplink timing of the terminal needs to compensate all the transmission delays. Because it is absolute compensation, an uplink transmission timing and a downlink transmission timing of the base station are aligned, and a sending moment of the terminal needs to be advanced by 2×maximum RTT. But because receiving a scheduling signal from the base station by the terminal has an absolute timing difference compared with the base station, at the moment, only the scheduling time intervals can be adjusted, that is, 2×maximum RTT is delayed to serve as a terminal sending moment predetermined by the base station, but UL signal is transmitted with a timing advance so as to ensure alignment of the timings of the terminal and the base station.

Therefore, in the embodiment of the present disclosure, in the case that the terminal performs absolute TA compensation, at the terminal, the terminal updates at least one of K1 (the transmission time interval between the PDSCH and the PUCCH) and K2 (the transmission time interval between the PDCCH and the PUSCH) configured to perform HARQ transmission scheduling. The updated K1 is equal to the sum of K1 configured to the terminal and one offset, and the updated K2 is equal to the sum of K2 configured to the terminal and one offset. Optionally, the offset is equal to the maximum RTT of the data transmission.

Optionally, under the above case, at the network device, when the base station performs HARQ transmission scheduling, the same method may also be adopted to increase the above offset (the maximum RTT) on the basis of K1 and K2 configured to the terminal, and perform the HARQ transmission scheduling on the terminal based on adjusted K1 and K2.

According to above description, in some embodiments, after the terminal accesses into the network, because an real TA of the terminal changes all the time, the network device does not know the numerical value of the TA of the terminal, HARQ timing management is performed with a maximum TA, and its network device defaults that the TA of the terminal is equal to the difference value obtained by subtracting the reference RTT from the maximum RTT (in the case that the terminal adopts relative TA compensation), or defaults that the TA of the terminal is equal to the maximum RTT (in the case that the terminal adopts absolute TA compensation). At the moment, the timing offset of K1 and K2 is equal to the defaulted TA value. Hereafter, if the terminal reports the TA, after the network device receives the TA reported by the terminal, one offset may be determined according to the TA reported by the terminal, and configured to adjust K1 and K2 of the terminal for HARQ scheduling, and the offset may be equal to the TA reported by the terminal.

Figure 11:
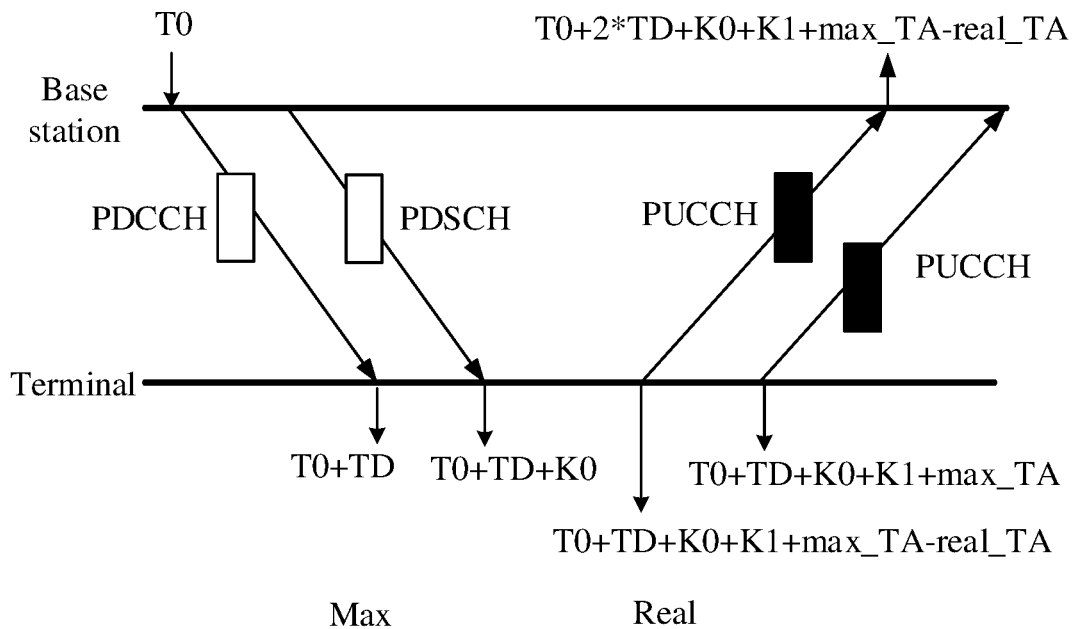
FIG. 11 and FIG. 12 exemplarily show schematic diagrams of downlink scheduling timings in an embodiment of the present disclosure.
Figure 12:
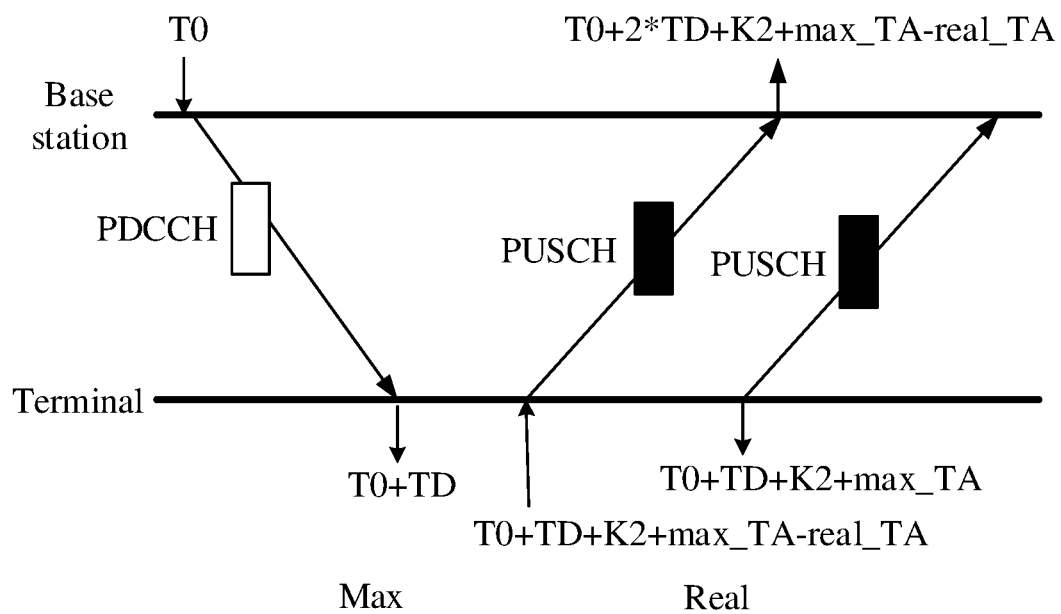

FIG. 11 and FIG. 12 exemplarily show schematic diagrams of downlink scheduling timings.

As shown in FIG. 11, taking an example that the terminal performs the absolute TA compensation, the base station sends the PDCCH at a T0 moment, and the terminal receives the PDSCH at a T0+TD+K0 moment, wherein K0 is a time interval between the PDCCH and the PDSCH configured by the base station, TD is a transmission delay from the base station to the terminal, and meanwhile, the moment when the base station designates the PUCCH to feed back HARQ-ACK is the K1 moment after receiving the PDSCH. A scheduled transmission moment of the PUCCH of the terminal is T0+TD+K0+K1+max_TA-real_TA, wherein max_TA represents the maximum TA, which is equal to the maximum RTT here, and real_TA represents the real TA of the terminal. A scheduling offset value here is equal to max_TA, and the offset value may be selected to be equal to or greater than the maximum TA, so as to ensure that a feedback sending time of the signal cannot be earlier than a receiving time of the signal.

As shown in FIG. 12, taking the example that the terminal performs the absolute TA compensation, the base station sends the PDCCH at the T0 moment, and the terminal receives the PDCCH at a T0+TD moment, wherein TD is the transmission delay from the base station to the terminal. The moment when the terminal sends the PDSCH is T0+TD+K2+max_TA-real_TA, wherein max_TA represents the maximum TA, which is equal to the maximum RTT here, and real_TA represents the real TA of the terminal.

Optionally, in some embodiments of the present disclosure, after the terminal completes RRC connection, if the terminal reports its TA (hereinafter represented as TA_UE), at the network device, the scheduling timing at the moment needs to add one offset on the basis of K1 or K2 configured by the network, the offset may be determined according to TA_UE reported by the terminal, and optionally, the offset may be equal to TA_UE reported by the terminal. Specifically, after receiving TA_UE reported by the terminal, the network device updates at least one of K1 and K2 of the terminal to serve as the offset value for scheduling the terminal, and the network device schedules the terminal according to the updated K1 and K2, wherein the updated K1 is equal to a sum of K1 before updating (namely, K1 configured to the terminal) and the offset, and the updated K2 is equal to a sum of K2 before updating (namely, K2 configured to the terminal) and the offset.

Optionally, in the above embodiment of the present disclosure, when values of RTT parameters (for example, the reference RTT, the maximum RTT, the real RTT of the terminal, etc.), transmission delay parameters (for example, the transmission delay of the feeder link, the reference transmission delay of the service link, the maximum transmission delay of the service link, etc.), or time offset (for example, the first offset, the second offset, a third offset, etc.) are not integer multiples of a time slot length, the time slot length may be rounded according to an real time numerical value. For example, ceiling or floor may be adopted, or the time slot length is quantized according to the real time numerical value, so that the time slot length is equal to the integer multiple of the time slot length of data transmission.

Optionally, in some embodiments, the terminal obtains a transmission delay difference value, increases the transmission delay difference value by taking a time of a current serving cell as a datum to so as to obtain a new time point, measures a synchronization signal and PBCH block (SSB) of a neighbor cell or a target cell at the new time point, and establishes downlink synchronization with the network or obtains broadcast information at the neighbor cell or the target cell, wherein the transmission delay difference value is a transmission delay difference value between the current serving cell and the neighbor cell received by the terminal, or a transmission delay difference value between the current serving cell and the target cell after cell switching, or a transmission delay difference value obtained by deducing after performing subtraction operation when the terminal obtains the timing advances (TA) or the transmission delays of the plurality of cells.

In some embodiments of the present disclosure, indication for the transmission delay may be used in measuring of the neighbor cell and quick synchronization of the target cell after switching.

Specifically, in a satellite movement process, the terminal may need to be connected to a new satellite, or the same satellite may be connected to a new gateway station. After being connected with the new satellite or connected with the new gateway station, if the target cell after switching is inconsistent with the current serving cell, the terminal needs to know a transmission delay difference of the cell after switching and the serving cell so as to quickly obtain a position of the synchronization signal and PBCH block (SSB) of the neighbor cell to perform downlink synchronization.

Identically, during radio resource management (RRM), if the transmission delay difference of the neighbor cell is obtained, RRM measuring of the neighbor cell is also performed quickly and advantageously.

Figure 13:
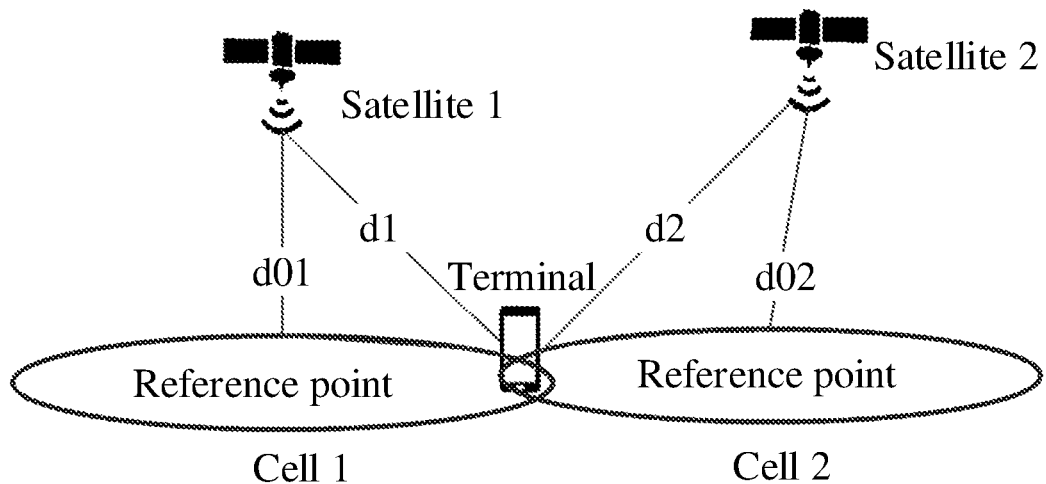
FIG. 13 exemplarily shows a schematic diagram of adjacent satellite switching in an embodiment of the present disclosure.
Figure 15:
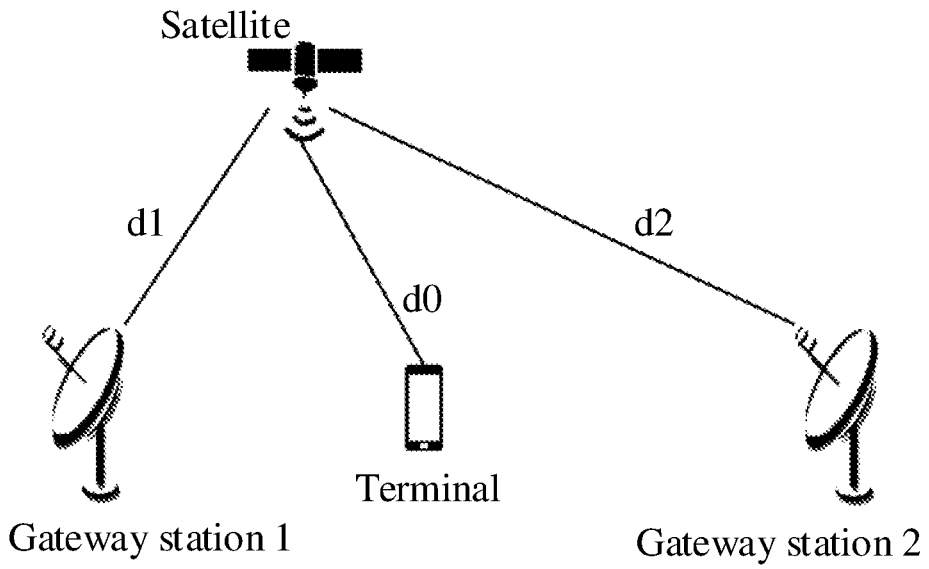
FIG. 15 exemplarily shows a schematic diagram of switching of a terminal between adjacent gateway stations in an embodiment of the present disclosure.

FIG. 13 and FIG. 15 show two cases, wherein FIG. 13 shows a switching case of the adjacent satellites, FIG. 15 shows switching of the adjacent gateway stations, and the transmission delay difference exist in the two cases.

As shown in FIG. 13, the terminal is in an overlapped coverage region of the two satellites. At the moment, it is assumed that the satellite has the function of the base station, a difference of a transmission distance d1 and a transmission distance d2 may be converted into the difference of a transmission time. However, because there are many users under the satellite, the network only indicates a common transmission distance d01 and d02 of the cell1 and the cell2, or a transmission delay value T1 and T2, and may also indicate an absolute value or a difference value of the timing advance (TA) of the two cells, the TA is calculated by taking a common TA as a datum, namely, 2 times of the common delays of the satellite and a reference point, and the TA value is configured to help the terminal to perform uplink synchronization, and may also indicate the difference value of the TA of the two cells. The terminal may obtain difference value information of the transmission delay based on indication of the network, and on the basis of the difference value information, the terminal detects and estimates the synchronization signal and PBCH block (SSB) of the neighbor cell or the target cell, so as to obtain synchronization information or cell broadcast information.

Figure 14:
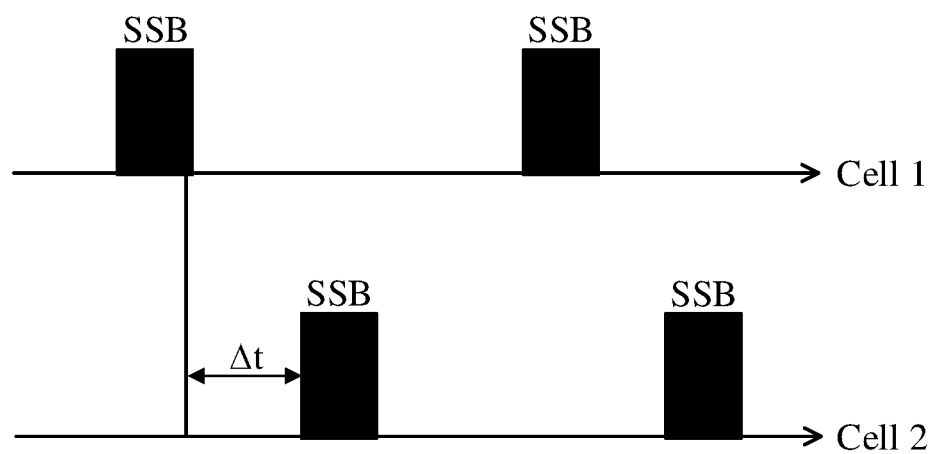
FIG. 14 exemplarily shows a schematic diagram of a synchronization signal time difference of a neighbor cell in an embodiment of the present disclosure.

FIG. 14 gives a synchronization signal time difference of the two neighbor cells or the current serving cell and the target cell after switching. Synchronization signal periods and time positions of the two cells are identical, but because times from the satellite or the gateway stations to the two cells have difference, the time difference will be embodied in the time difference when the terminal receives a synchronization signal, and the terminal deduces a time difference of the SSB signal according to a time difference of an indication point, so that the synchronization signal and a broadcast signal can be quickly detected.

FIG. 15 gives a scene of feed link switching. The same satellite is switched at the different gateway stations, the satellite may switch the feeder link according to the coverage region of the gateway stations, and at the moment, a distance between the satellite and the terminal is unchanged, that is, the transmission delay is unchanged. But when a feed distance is changed, the transmission delay is also changed, the network may indicate an absolute value of the feed transmission delay, or a relative value of the two gateway stations and the feeder link transmission delay of the satellite, based on the difference value, the terminal quickly obtains an SSB signal of the synchronization signal and PBCH block of the target cell from the new target cell after the feeder link is switched, so as to obtain the synchronization information or the cell broadcast information.

Based on the same technical concept, embodiments of the present disclosure further provide a terminal and a network device, which may be applied to the above embodiments respectively.

Figure 16:
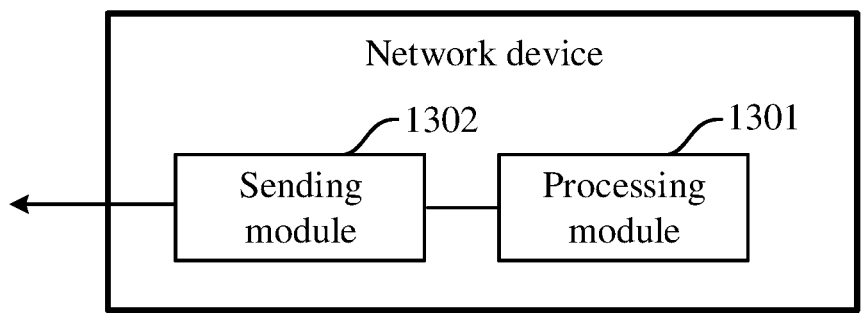
FIG. 16 exemplarily shows a schematic structural diagram of a network device provided by an embodiment of the present disclosure.

FIG. 16 exemplarily shows a schematic structural diagram of the network device provided by the embodiment of the present disclosure. As shown in the figure, the network device includes: a processing module 1301, and a sending module 1302.

The processing module 1301 is configured to determine a common transmission delay of at least one cell, wherein the common transmission delay is configured to determine a transmission timing between the network device and a terminal in the at least one cell; and the sending module 1302 is configured to send the common transmission delay to the terminal in the at least one cell.

Functions of all the modules in the above network device may refer to description of the function realized by the network device in the aforementioned embodiment, which will not be repeated here.

Figure 17:
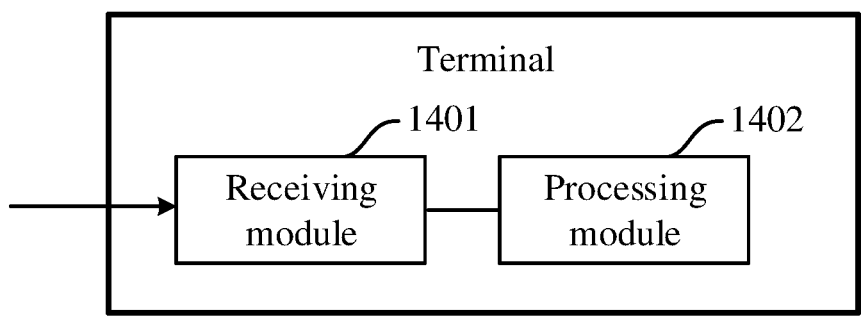
FIG. 17 exemplarily shows a schematic structural diagram of a terminal provided by an embodiment of the present disclosure.

FIG. 17 exemplarily shows a schematic structural diagram of the terminal in the embodiment of the present disclosure. As shown in the figure, the network device includes: a receiving module 1401 and a processing module 1402.

The receiving module 1401 is configured to receive a common transmission delay sent by a network device, wherein the common transmission delay is configured to determine a transmission timing between the network device and the terminal in at least one cell; and the processing module 1402 is configured to determine the transmission timing between the terminal and the network device according to the common transmission delay.

Functions of all the modules in the above terminal may refer to description of the function realized by the terminal in the aforementioned embodiment, which will not be repeated here.

Based on the same technical concept, embodiments of the present disclosure further provide a network device and a terminal, which may realize functions of the terminal and functions of the network device in the aforementioned embodiment respectively.

Figure 18:
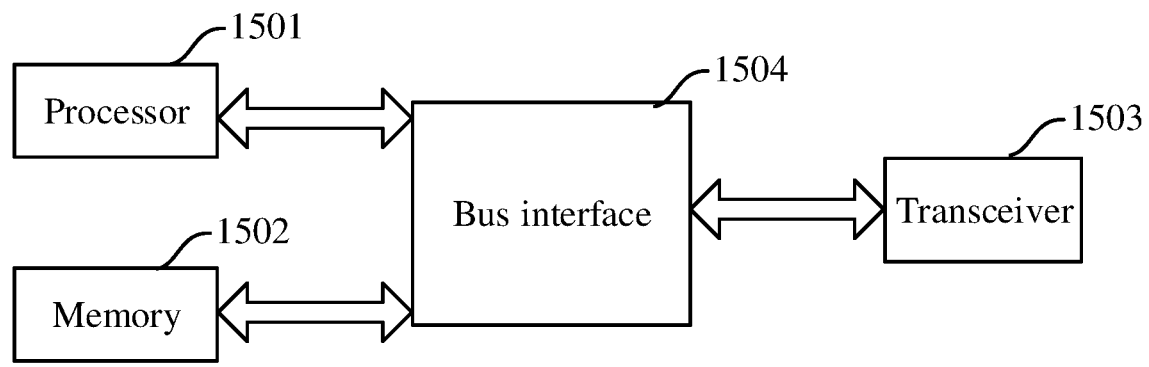
FIG. 18 exemplarily shows a schematic structural diagram of a network device provided by another embodiment of the present disclosure.

FIG. 18 exemplarily shows a schematic structural diagram of a network device in an embodiment of the present disclosure. As shown in the figure, the network device may include: a processor 1501, a memory 1502, a transceiver 1503 and a bus interface 1504.

The processor 1501 is responsible for managing a bus architecture and usual processing, and the memory 1502 may store data used by the processor 1501 during operation execution. The transceiver 1503 is configured to receive and send the data under control of the processor 1501.

The bus architecture may include any number of interconnected buses and bridges, which are specifically linked together by various circuits of one or more processors represented by the processor 1501 and a memory represented by the memory 1502. The bus architecture may further link various other circuits such as a peripheral device, a voltage stabilizer and a power management circuit together, which are publicly known in the art and therefore are not further described herein. The bus interface provides an interface. The processor 1501 is responsible for managing the bus architecture and usual processing, and the memory 1502 may store the data used by the processor 1501 during operation execution.

The flow disclosed in the embodiment of the present disclosure may be applied to the processor 1501, or be realized by the processor 1501. In a realizing process, all steps of the signal processing flow may be completed by an integrated logic circuit of hardware in the processor 1501 or an instruction in a software form. The processor 1501 may be a general-purpose processor, a digital signal processor, an application specific integrated circuit, a field-programmable gate array or other programmable logic devices, a discrete gate or a transistor logic device, a discrete hardware component, which can realize or execute all the methods, steps and logic block diagrams disclosed in the embodiment of the present disclosure. The general-purpose processor may be a microprocessor or any conventional processor, etc. The steps of the method disclosed in combination with the embodiment of the present disclosure may be directly executed and completed by the hardware processor, or be executed and completed by a hardware and software module combination in the processor. A software module may be located in a random access memory, a flash memory, a read only memory, a programmable read only memory, or an electrically erasable programmable memory, a register and other mature storage mediums in the art. The storage medium is located in the memory 1502, and the processor 1501 reads information in the memory 1502, and is combined with its hardware to complete the steps of the signal processing flow.

Specifically, the processor 1501 is configured to read a computer instruction in the memory 1502 and execute the function realized by the network device in the flow shown in FIG. 7.

Based on the same technical concept, an embodiment of the present disclosure further provides a terminal, and the terminal may realize the function of the terminal in the aforementioned embodiment.

Figure 19:
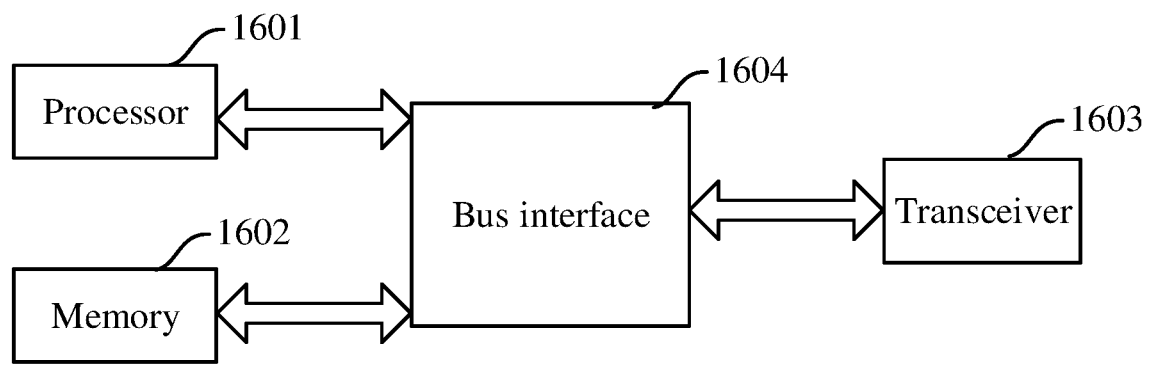
FIG. 19 exemplarily shows a schematic structural diagram of a terminal provided by another embodiment of the present disclosure.

FIG. 19 exemplarily shows a schematic structural diagram of the terminal in the embodiment of the present disclosure. As shown in the figure, the terminal may include: a processor 1601, a memory 1602, a transceiver 1603 and a bus interface 1604.

The processor 1601 is responsible for managing a bus architecture and usual processing, and the memory 1602 may store data used by the processor 1601 during operation execution. The transceiver 1603 is configured to receive and send the data under control of the processor 1601.

The bus architecture may include any number of interconnected buses and bridges, which are specifically linked together by various circuits of one or more processors represented by the processor 1601 and a memory represented by the memory 1602. The bus architecture may further link various other circuits such as a peripheral device, a voltage stabilizer and a power management circuit together, which are publicly known in the art and therefore are not further described herein. The bus interface provides an interface. The processor 1601 is responsible for managing the bus architecture and usual processing, and the memory 1602 may store the data used by the processor 1601 during operation execution.

The flow disclosed in the embodiment of the present disclosure may be applied to the processor 1601, or be realized by the processor 1601. In a realizing process, all steps of the signal processing flow may be completed by an integrated logic circuit of hardware in the processor 1601 or an instruction in a software form. The processor 1601 may be a general-purpose processor, a digital signal processor, an application specific integrated circuit, a field-programmable gate array or other programmable logic devices, a discrete gate or a transistor logic device, a discrete hardware component, which can realize or execute all the methods, steps and logic block diagrams disclosed in the embodiment of the present disclosure. The general-purpose processor may be a microprocessor or any conventional processor, etc. The steps of the method disclosed in combination with the embodiment of the present disclosure may be directly executed and completed by the hardware processor, or be executed and completed by a hardware and software module combination in the processor. A software module may be located in a random access memory, a flash memory, a read only memory, a programmable read only memory, or an electrically erasable programmable memory, a register and other mature storage mediums in the art. The storage medium is located in the memory 1602, and the processor 1601 reads information in the memory 1602, and is combined with its hardware to complete the steps of the signal processing flow.

Specifically, the processor 1601 is configured to read a computer instruction in the memory 1602 and execute the function realized by the terminal in the flow shown in FIG. 8.

An embodiment of the present disclosure further provides a computer readable storage medium, storing a computer executable instruction, wherein the computer executable instruction is configured to enable a computer to execute the method executed by the terminal in the above embodiment.

An embodiment of the present disclosure further provides a computer readable storage medium, storing a computer executable instruction, wherein the computer executable instruction is configured to enable a computer to execute the method executed by the network device in the above embodiment.

The present disclosure is described with reference to flow charts and/or block diagrams of the methods, the devices (systems), and the computer program products according to the embodiments of the present application. It should be understood that each flow and/or block in the flow charts and/or the block diagrams and combinations of the flows and/or the blocks in the flow charts and/or the block diagrams can be implemented by computer program instructions. The computer program instructions may be provided to a processor of a general-purpose computer, a special-purpose computer, an embedded processing machine or other programmable data processing devices to generate a machine, such that the instructions, when executed by the processor of the computers or other programmable data processing devices, generate an apparatus for implementing functions specified in one or more flows in the flow charts and/or one or more blocks in the block diagrams.

These computer program instructions may also be stored in a computer readable memory which can guide the computers or other programmable data processing devices to work in a specific mode, thus the instructions stored in the computer readable memory generates an article of manufacture that includes a commander apparatus that implement the functions specified in one or more flows in the flow charts and/or one or more blocks in the block diagrams.

The computer program instructions may also be loaded to the computers or other programmable data processing devices, so that a series of operating steps may be executed on the computers or other programmable devices to generate computer-implemented processing, such that the instructions executed on the computers or other programmable devices provide steps for implementing the functions specified in one or more flows in the flow charts and/or one or more blocks in the block diagrams.

Although the preferred embodiments of the present disclosure have been described, those skilled in the art can make additional modifications and variations on the embodiments once they know the basic creative concept. Therefore, the appended claim intends to be explained as including the preferred embodiments and all modifications and variations falling within the scope of the present disclosure.

Obviously, those skilled in the art can make various modifications and variations to the present disclosure without departing from the spirit and scope of the present disclosure. In this way, if these modifications and variations of the present disclosure fall within the scope of the claims of the present disclosure and their equivalent art, the present disclosure also intends to include these modifications and variations.

What is claimed is:

1. A transmission delay indication method, comprising:
determining, by a network device, a common transmission delay of at least one cell, wherein the common transmission delay is configured to determine a transmission timing between the network device and a terminal in the at least one cell; and
sending, by the network device, the common transmission delay to the terminal in the at least one cell;
further comprising:
receiving, by the network device, a timing advance (TA) of the terminal sent by the terminal; and
determining, by the network device, an offset according to the TA, and updating at least one of a first time interval and a second time interval configured to perform hybrid automatic retransmission reQuest (HARQ) transmission scheduling on the terminal,
wherein an updated first time interval is a sum of the first time interval configured to the terminal and the offset, and an updated second time interval is a sum of the second time interval configured to the terminal and the offset;
wherein the first time interval is a transmission time interval between a physical downlink shared channel (PDSCH) and a physical uplink control channel (PUCCH), and the second time interval is a transmission time interval between a physical downlink control channel (PDCCH) and a physical uplink shared channel (PUSCH).

2. The method according to claim 1, wherein the common transmission delay comprises at least one of the following information:
a reference round trip time (RTT) of data transmission between the terminal in the at least one cell and the network device;
a maximum RTT of data transmission between the terminal in the at least one cell and the network device;
a difference value between a maximum RTT and a reference RTT of data transmission between the terminal in the at least one cell and the network device;
a transmission delay of a feeder link in a satellite communication system, wherein the feeder link is a link between a gateway station and a satellite;
a reference transmission delay of a service link in a satellite communication system, wherein the service link is a link between a satellite and a terminal;
a maximum transmission delay of a service link in the satellite communication system;
a difference value between a maximum transmission delay and a reference transmission delay of a service link in a satellite communication system;
a transmission delay of a satellite or a gateway station and a common reference point of the at least one cell;
a difference value between transmission delays of a satellite or a gateway station and common reference points of a plurality of different cells;
a TA determined based on a transmission delay of a satellite or a gateway station and a common reference point of the at least one cell; or
a difference value between TAs of different cells.

3. The method according to claim 1, wherein the sending, by the network device, the common transmission delay to the terminal comprises:
sending, by the network device, the common transmission delay to the terminal through broadcast information or a dedicated signaling.

4. The method according to claim 1, wherein a value of the offset is equal to an integral multiple of a data transmission time slot length.

5. The method according to claim 1, wherein a value of the common transmission delay is equal to an integral multiple of a data transmission time slot length.

6. A network device, comprising: a processor, a memory and a transceiver, wherein the processor is configured to read a computer instruction in the memory to execute the method according to claim 1.

7. A transmission delay indication method, comprising:
receiving, by a terminal, a common transmission delay sent by a network device, wherein the common transmission delay is configured to determine a transmission timing between the network device and the terminal in at least one cell; and
determining, by the terminal, the transmission timing between the terminal and the network device according to the common transmission delay;
wherein the determining, by the terminal, the transmission timing between the terminal and the network device according to the common transmission delay, comprises one of the following schemes:
scheme 1:
determining, by the terminal, a starting time and a duration of a random access response (RAR) window of the terminal according to the common transmission delay, wherein the starting time of the RAR window is a moment after delaying a sending moment of a random access preamble sent by the terminal by at least a reference RTT time length;
wherein the common transmission delay comprises at least two of the reference RTT, the maximum RTT, or the difference value between the maximum RTT and the reference RTT of data transmission, and the reference RTT, the maximum RTT, and the difference value between the maximum RTT and the reference RTT configured to determine the starting time and the duration of the RAR window by the terminal are determined by the terminal from delay information contained in the common transmission delay; or at least one of the reference RTT and the maximum RTT configured to determine the starting time and the duration of the RAR window by the terminal is determined by the terminal according to delay information contained in the common transmission delay;
scheme 2:
determining, by the terminal, a starting time and a duration of a ra-ContentionResolutionTimer of the terminal according to the common transmission delay, wherein the starting time of the ra-ContentionResolutionTimer is a moment after delaying a sending moment of a Msg3 sent by the terminal by at least a reference RTT time length;
wherein the common transmission delay comprises at least two of the reference RTT, the maximum RTT, or the difference value between the maximum RTT and the reference RTT of data transmission, and the reference RTT, the maximum RTT, and the difference value between the maximum RTT and the reference RTT configured to determine a starting time and a duration of the ra-ContentionResolutionTimer by the terminal are determined by the terminal from delay information contained in the common transmission delay; or at least one of the reference RTT and the maximum RTT configured to determine the starting time and the duration of the ra-ContentionResolutionTimer by the terminal is determined by the terminal according to delay information contained in the common transmission delay;
scheme 3:
updating, by the terminal, at least one of a first time interval and a second time interval configured to perform hybrid automatic retransmission reQuest (HARQ) transmission scheduling according to the common transmission delay,
wherein an updated first time interval is a sum of the first time interval configured to the terminal and a third offset, an updated second time interval is a sum of the second time interval configured to the terminal and the third offset, and the third offset is equal to a difference value obtained by subtracting a reference RTT from a maximum RTT of data transmission or equal to the maximum RTT;
the first time interval is a transmission time interval between a physical downlink shared channel (PDSCH) and a physical uplink control channel (PUCCH), and the second time interval is a transmission time interval between a physical downlink control channel (PDCCH) and a physical uplink shared channel (PUSCH); and
the common transmission delay comprises at least two of the reference RTT, the maximum RTT, or the difference value between the maximum RTT and the reference RTT of data transmission, and the reference RTT, the maximum RTT, and the difference value between the maximum RTT and the reference RTT configured to update the first time interval and the second time interval by the terminal are determined by the terminal from delay information contained in the common transmission delay; or at least one of the reference RTT and the maximum RTT configured to update the first time interval and the second time interval by the terminal is determined by the terminal according to delay information contained in the common transmission delay.

8. The method according to claim 7, wherein
in the scheme 1:
the duration of the RAR window is equal to a sum of a difference value between a maximum RTT and a reference RTT and a base station processing delay;
wherein a time length by which the sending moment of the random access preamble sent by the terminal is delayed is equal to a sum of the reference RTT and a first offset;
wherein the first offset is equal to a difference value obtained by subtracting the reference RTT from a real RTT of the terminal;
in the scheme 2:
the duration of the ra-ContentionResolutionTimer is equal to a sum of a difference value between a maximum RTT and a reference RTT and a base station processing delay;
wherein a time length by which the sending moment of the Msg3 sent by the terminal is delayed is equal to a sum of the reference RTT and a second offset;
wherein the second offset is equal to a difference value obtained by subtracting the reference RTT from a real RTT of the terminal.

9. The method according to claim 7, further comprising:
determining, by the terminal, the reference RTT according to a transmission delay of a feeder link of a satellite communication system and a reference transmission delay of a service link of the satellite communication system; and
determining, by the terminal, the maximum RTT according to the transmission delay of the feeder link of the satellite communication system and a maximum transmission delay of the service link of the satellite communication system, wherein
the transmission delay of the feeder link, the reference transmission delay of the service link, and the maximum transmission delay of the service link are comprised in the common transmission delay.

10. The method according to claim 7, further comprising:
determining, by the terminal, the reference RTT according to a reference transmission delay of a service link of a satellite communication system; and
determining, by the terminal, the maximum RTT according to a maximum transmission delay of the service link of the satellite communication system, wherein
the reference transmission delay of the service link and the maximum transmission delay of the service link are comprised in the common transmission delay.

11. The method according to claim 7, wherein the common transmission delay comprises at least one of the following information:
a reference round trip time (RTT) of data transmission between the network device and the terminal in the at least one cell;
a maximum RTT of data transmission between the network device and the terminal in the at least one cell;
a difference value between a maximum RTT and a reference RTT of data transmission between the network device and the terminal in the at least one cell;
a transmission delay of a feeder link in a satellite communication system, wherein the feeder link is a link between a gateway station and a satellite;
a reference transmission delay of a service link in a satellite communication system, wherein the service link is a link between a satellite and a terminal;
a maximum transmission delay of a service link in the satellite communication system;
a difference value between a maximum transmission delay and a reference transmission delay of a service link in a satellite communication system;
a transmission delay of a satellite or a gateway station and a common reference point of the at least one cell;
a difference value between transmission delays of different cells;
a timing advance (TA) determined based on a transmission delay of a satellite or a gateway station and a common reference point of the at least one cell; or
a difference value between TAs of different cells.

12. The method according to claim 11, further comprising:
obtaining, by the terminal, a transmission delay difference value, wherein the transmission delay difference value is a transmission delay difference value between a current serving cell and a neighbor cell received by the terminal, or a transmission delay difference value between a current serving cell and a target cell after cell switching, or a transmission delay difference value obtained by deducing after performing subtraction operation when the terminal obtains TAs or transmission delays of a plurality of cells; and
obtaining, by the terminal, a new time point by increasing the transmission delay difference value by taking a time of a current serving cell as a datum, measuring a synchronization signal and PBCH block (SSB) of a neighbor cell or a target cell at the new time point, and establishing downlink synchronization with a network or obtaining broadcast information at the neighbor cell or the target cell.

13. The method according to claim 7, wherein a value of the common transmission delay is equal to an integral multiple of a data transmission time slot length.

14. A terminal, comprising: a processor, a memory, and a transceiver, wherein the processor is configured to read a computer instruction in the memory to execute:
receiving a common transmission delay sent by a network device, wherein the common transmission delay is configured to determine a transmission timing between the network device and the terminal in at least one cell; and
determining the transmission timing between the terminal and the network device according to the common transmission delay;
wherein the processor is further configured to:
determine a starting time and a duration of a random access response (RAR) window of the terminal according to the common transmission delay, wherein the starting time of the RAR window is a moment after delaying a sending moment of a random access preamble sent by the transceiver by at least a reference RTT time length;
the common transmission delay comprises at least two of the reference RTT, the maximum RTT, or the difference value between the maximum RTT and the reference RTT of data transmission, and the reference RTT, the maximum RTT, and the difference value between the maximum RTT and the reference RTT configured to determine the starting time and the duration of the RAR window by the terminal are determined by the terminal from delay information contained in the common transmission delay; or at least one of the reference RTT and the maximum RTT configured to determine the starting time and the duration of the RAR window by the terminal is determined by the terminal according to delay information contained in the common transmission delay;
or
determine a starting time and a duration of a ra-ContentionResolutionTimer of the terminal according to the common transmission delay, wherein the starting time of the ra-ContentionResolutionTimer is a moment after delaying a sending moment of a Msg3 sent by the transceiver by at least a reference RTT time length; and
the common transmission delay comprises at least two of the reference RTT, the maximum RTT, or the difference value between the maximum RTT and the reference RTT of data transmission, and the reference RTT, the maximum RTT, and the difference value between the maximum RTT and the reference RTT configured to determine a starting time and a duration of the ra-ContentionResolutionTimer by the terminal are determined by the terminal from delay information contained in the common transmission delay; or the at least one of the reference RTT and the maximum RTT configured to determine the starting time and the duration of the ra-ContentionResolutionTimer by the terminal is determined by the terminal according to delay information contained in the common transmission delay;
or
update at least one of a first time interval and a second time interval configured to perform hybrid automatic retransmission reQuest (HARQ) transmission scheduling by the terminal according to the common transmission delay,
wherein an updated first time interval is a sum of the first time interval configured to the terminal and a third offset, an updated second time interval is a sum of the second time interval configured to the terminal and the third offset, and the third offset is equal to a difference value obtained by subtracting a reference RTT from a maximum RTT of data transmission or equal to the maximum RTT;

the first time interval is a transmission time interval between a physical downlink shared channel (PDSCH) and a physical uplink control channel (PUCCH), and the second time interval is a transmission time interval between a physical downlink control channel (PDCCH) and a physical uplink shared channel (PUSCH); and the common transmission delay comprises at least two of the reference RTT, the maximum RTT, or the difference value between the maximum RTT and the reference RTT of data transmission, and the reference RTT, the maximum RTT, and the difference value between the maximum RTT and the reference RTT configured to update the first time interval and the second time interval by the terminal are determined by the terminal from delay information contained in the common transmission delay; or the at least one of the reference RTT and the maximum RTT configured to update the first time interval and the second time interval by the terminal is determined by the terminal according to delay information contained in the common transmission delay.

15. The terminal according to claim 14, wherein the duration of the RAR window is equal to a sum of a difference value between a maximum RTT and a reference RTT and a base station processing delay;

wherein a time length by which the sending moment of the random access preamble sent by the transceiver is delayed is equal to a sum of the reference RTT and a first offset;

wherein the first offset is equal to a difference value obtained by subtracting the reference RTT from a real RTT of the terminal;

or the duration of the ra-ContentionResolutionTimer is equal to a sum of a difference value between a maximum RTT and a reference RTT and a base station processing delay; and wherein a time length by which the sending moment of the Msg3 sent by the transceiver is delayed is equal to a sum of the reference RTT and a second offset;

wherein the second offset is equal to a difference value obtained by subtracting the reference RTT from a real RTT of the terminal.

16. The terminal according to claim 14, wherein the processor is further configured to:

determine the reference RTT according to a transmission delay of a feeder link of a satellite communication system and a reference transmission delay of a service link of the satellite communication system; and determine the maximum RTT according to the transmission delay of the feeder link of the satellite communication system and a maximum transmission delay of the service link of the satellite communication system, wherein the transmission delay of the feeder link, the reference transmission delay of the service link, and the maximum transmission delay of the service link are comprised in the common transmission delay.

17. The terminal according to claim 14, wherein the processor is further configured to:

determine the reference RTT according to a reference transmission delay of a service link of a satellite communication system; and determine the maximum RTT according to a maximum transmission delay of the service link of the satellite communication system, wherein the reference transmission delay of the service link and the maximum transmission delay of the service link are comprised in the common transmission delay.

18. The terminal according to claim 14, wherein the common transmission delay comprises at least one of the following information:

a reference round trip time (RTT) of data transmission between the network device and the terminal in the at least one cell;

a maximum RTT of data transmission between the network device and the terminal in the at least one cell;

a difference value between a maximum RTT and a reference RTT of data transmission between the network device and the terminal in the at least one cell;

a transmission delay of a feeder link in a satellite communication system, wherein the feeder link is a link between a gateway station and a satellite;

a reference transmission delay of a service link in a satellite communication system, wherein the service link is a link between a satellite and a terminal;

a maximum transmission delay of a service link in the satellite communication system;

a difference value between a maximum transmission delay and a reference transmission delay of a service link in a satellite communication system;

a transmission delay of a satellite or a gateway station and a common reference point of the at least one cell;

a difference value between transmission delays of different cells;

a timing advance (TA) determined based on a transmission delay of a satellite or a gateway station and a common reference point of the at least one cell; or a difference value between TAs of different cells.

19. The terminal according to claim 14, wherein a value of the common transmission delay is equal to an integral multiple of a data transmission time slot length.

* * * * *